(12) United States Patent
Xu et al.

(10) Patent No.: US 11,435,941 B1
(45) Date of Patent: Sep. 6, 2022

(54) MATRIX TRANSPOSE HARDWARE ACCELERATION

(71) Applicant: Amazon Technologies, Inc., Seattle, WA (US)

(72) Inventors: Kun Xu, Austin, TX (US); Paul Gilbert Meyer, Rollingwood, TX (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 16/911,127

(22) Filed: Jun. 24, 2020

(51) Int. Cl.
| | | |
|---|---|---|
| *G06F 3/06* | (2006.01) | |
| *G06N 5/04* | (2006.01) | |
| *G06N 3/02* | (2006.01) | |

(52) U.S. Cl.
CPC .......... *G06F 3/0655* (2013.01); *G06F 3/0604* (2013.01); *G06F 3/0673* (2013.01); *G06N 3/02* (2013.01); *G06N 5/04* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08;
(Continued)

(56) References Cited

U.S. PATENT DOCUMENTS

| | | | | |
|---|---|---|---|---|
| 2003/0088600 | A1* | 5/2003 | Lao ........................ | G06F 7/785 708/520 |
| 2009/0290800 | A1* | 11/2009 | Lo ....................... | G06V 10/7515 382/197 |

(Continued)

OTHER PUBLICATIONS

Permuting Matrices Stored in Sparse Format; Gustavson, F. G.; IBM Technical Disclosure Bulletin, vol. 16, No. 1, pp. 357-359; Jun. 1973 (Year: 1973).*

(Continued)

*Primary Examiner* — Daniel C. Chappell
(74) *Attorney, Agent, or Firm* — Kilpatrick Townsend & Stockton LLP

(57) ABSTRACT

In one example, an apparatus comprises: a memory array having an array of memory elements arranged in rows and columns, each memory element being configured to store a data element; and a memory access circuit configured to: perform a row write operation to store a first group of data elements at a first row of the array of memory elements; perform a column read operation at a first column of the array of memory elements to obtain a second group of data elements; and perform a column write operation to store a third group of data elements at the first column of the array of memory elements to replace the second group of data elements.

20 Claims, 18 Drawing Sheets

(58) Field of Classification Search
CPC ............. G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–6095; H04L 67/00–42
See application file for complete search history.

(56) References Cited

U.S. PATENT DOCUMENTS

| | | | |
|---|---|---|---|
| 2011/0072206 A1* | 3/2011 | Ross | G06F 3/0604 711/108 |
| 2014/0359199 A1* | 12/2014 | Huppenthal | G11C 11/40615 711/149 |
| 2018/0188972 A1* | 7/2018 | Yang | G06F 3/0611 |
| 2019/0147937 A1* | 5/2019 | Hush | G11C 11/4091 711/105 |
| 2020/0174707 A1* | 6/2020 | Johnson | G06F 3/0673 |
| 2021/0004645 A1* | 1/2021 | Chaudhuri | G06K 9/6257 |
| 2021/0034567 A1* | 2/2021 | Bringivijayaraghavan | G06F 3/0659 |
| 2021/0182077 A1* | 6/2021 | Chen | G06N 3/04 |
| 2021/0278992 A1* | 9/2021 | Malladi | G06F 3/0655 |
| 2021/0397932 A1* | 12/2021 | Yudanov | G06F 3/0604 |

OTHER PUBLICATIONS

Row Major Vs Column Major; David Lively; Oct. 16, 2016; retrieved from https://web.archive.org/web/20161016223108/http://davidlively.com/programming/graphics/opengl-matrices/row-major-vs-column-major/ on Oct. 9, 2021 (Year: 2016).*

How to Transpose a Matrix; wikiHow; Jul. 26, 2019; retrieved from https://www.wikihow.com/Transpose-a-Matrix on Sep. 14, 2021 (Year: 2019).*

P. Stathis, D. Cheresiz, S. Vassiliadis and B. Juurlink, "Sparse matrix transpose unit," 18th International Parallel and Distributed Processing Symposium, 2004. Proceedings., 2004, pp. 90-, doi: 10.1109/IPDPS.2004.1303033. (Year: 2004).*

A. Edelman, S. Heller and S. Lennart Johnsson, "Index transformation algorithms in a linear algebra framework," in IEEE Transactions on Parallel and Distributed Systems, vol. 5, No. 12, pp. 1302-1309, Dec. 1994, doi: 10.1109/71.334903. (Year: 1994).*

Z. Zhou and Z. Pan, "Effective Hardware Accelerator for 2D DCT/IDCT Using Improved Loeffler Architecture," in IEEE Access, vol. 10, pp. 11011-11020, 2022, doi: 10.1109/ACCESS.2022.3146162. (Year: 2022).*

P. Chen, M. Wahib, S. Takizawa, R. Takano and S. Matsuoka, "Efficient Algorithms for the Summed Area Tables Primitive on GPUs," 2018 IEEE International Conference on Cluster Computing (CLUSTER), 2018, pp. 482-493, doi: 10.1109/CLUSTER.2018.00064. (Year: 2018).*

* cited by examiner

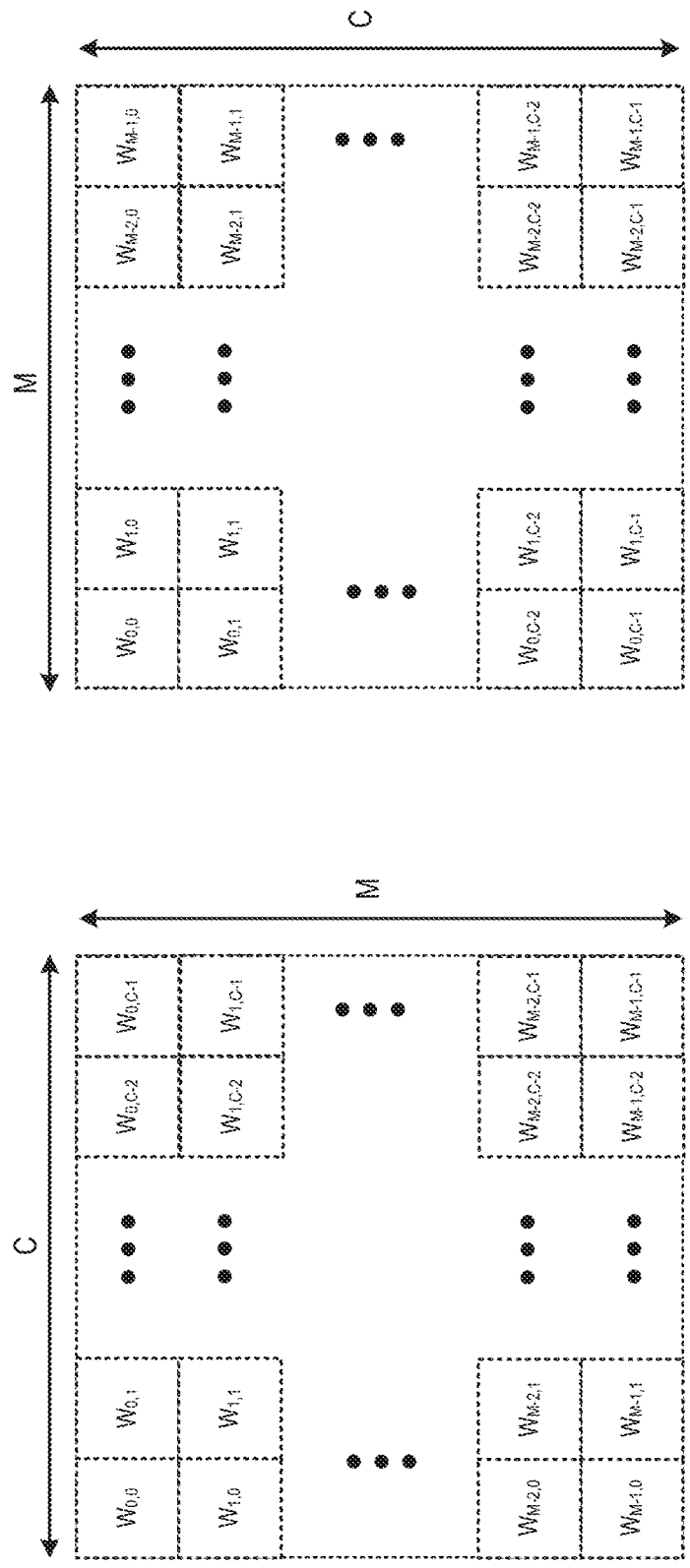

552 & 554 → row_write: asserted
row_read: de-asserted

554 & 556 → row_write: de-asserted
row_read: de-asserted

558 & 560 → row_write: asserted
row_read: asserted

MATRIX TRANSPOSE HARDWARE ACCELERATION

BACKGROUND

Artificial neural networks are computing systems with an architecture based on biological neural networks. An artificial neural network can include a set of weights. Through computations, the weights can be combined with input data to perform an inferencing operation. For example, for a computer vision application to detect an object, the artificial neural network can combine the weights with an input image to extract certain features of the object from the image. Based on the extracted features, the artificial neural network can generate a decision of whether the object is in the image. Artificial neural networks can be trained, using training data in a training operation, to learn about how to perform the inferencing operation for an application.

An artificial neural network typically performs computations on data in the form of matrices to perform the inferencing operations and the training operations. For example, input data and weights can be organized into matrices. The artificial neural network can perform various matrix computations, such as dot-product computations between the input data and weight matrices, at each neural network layer for a computing task. In addition, the data and weights matrices can be pre-processed to support the matrix computations.

BRIEF DESCRIPTION OF THE DRAWINGS

Various embodiments in accordance with the present disclosure will be described with reference to the drawings, in which:

FIGS. 3A-3B illustrate examples of a training operation of a neural network and matrix transpose operations involved in the training operation;

DETAILED DESCRIPTION

Figure 1:
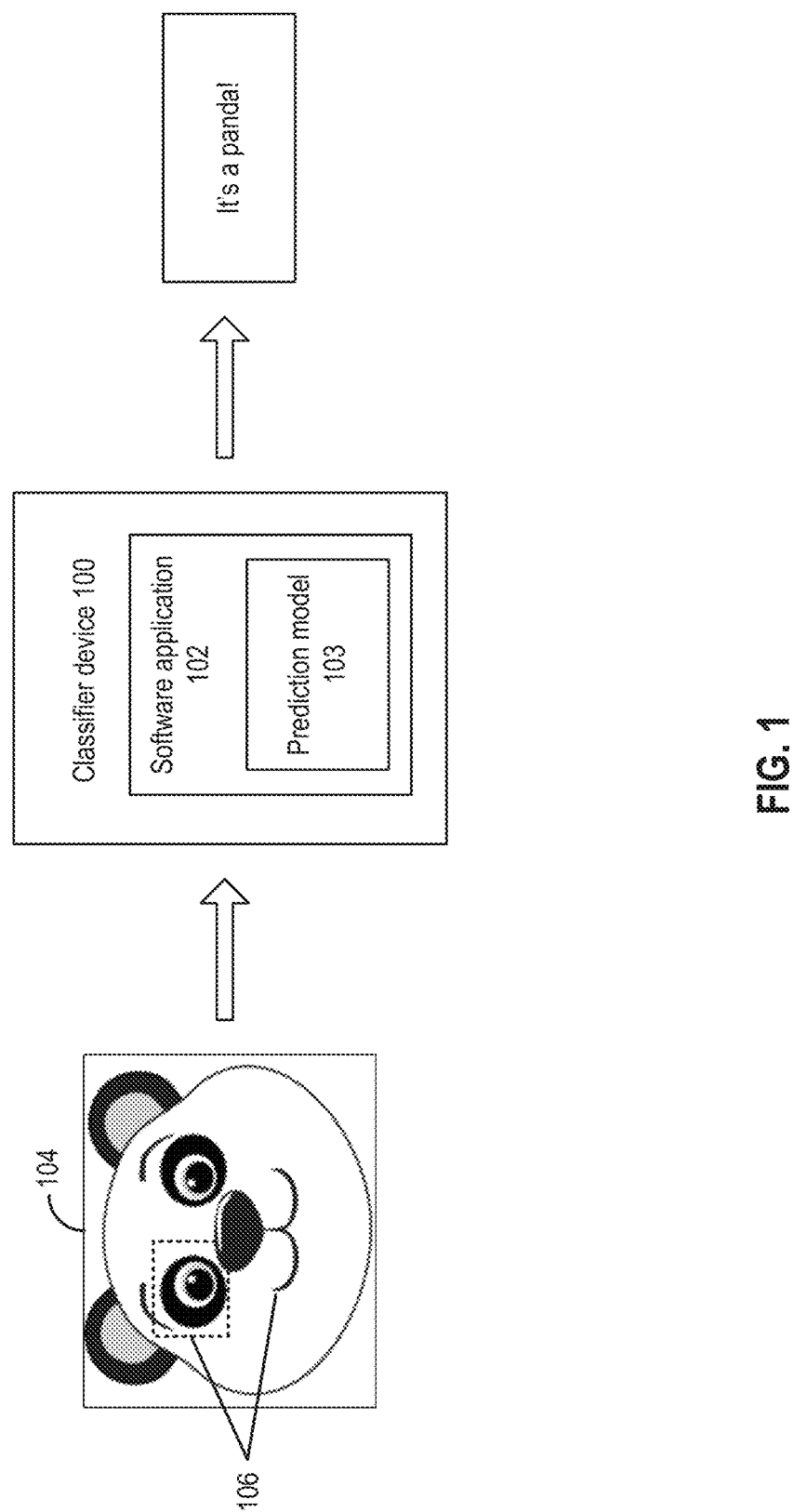
FIG. 1 illustrates an example of a classifier device that uses techniques disclosed herein to process data.

Examples of the present disclosure relate to neural network processing, and more specifically, to techniques of accelerating matrix transpose operations to support neural network computations.

An artificial neural network (hereinafter, "neural network") is typically implemented in a computing system, such as a neural network hardware accelerator, to have an architecture based on biological neural networks and to process input data in an analogous fashion as biological neural networks. A neural network typically includes a number of cascading neural network layers, with each layer including a set of weights. In an inferencing operation, each layer can combine input data, which can include inputs to the neural network layer, intermediate output from a previous layer, etc., with the weights to generate intermediate outputs and propagate the intermediate outputs to a higher neural network layer. The forward propagation operations can start at the first neural network layer and end at the highest neural network layer. The forward propagation operation at each neural network layer can represent different stages of extraction and processing of the inputs to the neural network. The neural network can then generate a decision based on the output of the highest neural network layer.

The set of weights of the neural network can be generated and/or updated by a training operation to improve the likelihood of the neural network generating a correct decision. The training operation can be performed by the same computing system (e.g., a neural network hardware accelerator) that performs the inferencing operation. An example training operation can use a gradient descent scheme. Specifically, as part of the training operation, the aforementioned forward propagation operations can be performed on a training input data set, using the set of weights at each neural network layer, to generate a training output data set at the highest-level neural network layer. The training output data, as well as target output data, can be input to a loss gradient operation to compute loss gradients representing a partial derivative of the output errors (between the training output data and the target output data) with respect to the training output data. The loss gradients can be propagated back to the highest neural network layer.

A set of backward propagation operations can then be performed at each neural network layer. At the highest neural network layer, a first backward propagation operation can be performed, in which the loss gradients can be combined with the intermediate outputs of the previous neural network layer (the second-highest neural network layer) to generate first weight gradients for the highest neural network layer. The first weight gradients can represent a partial derivative of the output errors with respect to the weights of the highest neural network layer. The first weight gradients can be used to update the weights of the highest neural network layer to minimize the output errors. Moreover, the loss gradients can be combined with the original weights of the highest neural network layer to obtain first error gradients. The first error gradients can then be propagated backward to the second-highest neural network layer, which can then perform a second backward propagation operation to generate second weight gradients and second error gradients and propagate the second data gradients to the preceding layer. The backward propagation operation can be performed from the highest neural network layer backward to the lowest neural network layer to compute weight gradients to update the weights at each layer. The training operation can be repeated for the same input data set for a number of iterations until a loss objective (e.g., a threshold first output error from the highest neural network layer) is achieved.

A neural network hardware accelerator can be programmed to implement a neural network to perform computing tasks. A neural network hardware accelerator typically performs computations of data in the form of matrices for the inferencing operations and the training operation. For example, the combination of inputs and weights in the forward propagation operations, the combination of intermediate outputs and error gradients, the combination of weights and weight gradients in the backward propagation operations, etc., can be in the form of dot-product computations between matrices. To accelerate the dot-product computations, the neural network hardware accelerator may include dedicated circuits, such as arithmetic circuits, to perform the arithmetic operations involved in the dot-product computations.

In addition, the data matrices (input and intermediate outputs, weights, etc.) can be pre-processed to support the matrix computations. One example of a pre-processing operation may include a matrix transpose operation, in which the indices of two dimensions of a matrix are swapped. For example, for a two-dimensional matrix organized into rows and columns, a transpose operation can be performed by swapping the matrix row indices and matrix column indices, which can result in flipping the matrix over its diagonal. Matrix transpose operations can be performed during the training operation of a neural network. For example, the weight matrix of a neural network layer is combined with inputs to the neural network layer in a forward propagation operation, but in the backward propagation operation of that layer, a transposed version of the weight matrix is combined with an input error gradient matrix (received from the next layer) to compute an output error gradient matrix to be propagated to the preceding layer. The transposed version of the weight matrix is also combined with the weight gradients to adjust the weights. In addition, in a case where the neural network is configured as a convolutional neural network (CNN), the intermediate outputs matrix from a forward propagation operation of a neural network layer can also be transposed and combined with the input error gradients matrix (received from the next layer) to generate weight gradients in the backward propagation of that neural network layer.

The neural network hardware accelerator typically includes (or has access to) a local buffer to provide temporary storage of data involved in neural network computations, such as input and output data to a neural network or intermediate outputs and weights of each neural network layer. The local buffer can include a memory array such as an array of registers or an array of static random-access memory (SRAM) devices. The neural network hardware accelerator can use the local buffer to perform a matrix transpose operation. For example, the neural network hardware accelerator can read a data matrix (e.g., a matrix of input data, a matrix of output data, a matrix of weights, a matrix of intermediate outputs) from a source memory (e.g., dynamic random-access memory (DRAM) devices, SRAM devices, high-bandwidth memory (HBM) devices) to obtain a data matrix. To perform a transpose operation of the data matrix, the neural network hardware accelerator can write the data matrix at the local buffer in a particular orientation and then read the data matrix from the local buffer in a different orientation. The data matrix read from the local buffer can then be written to a destination memory (e.g., the same or another DRAM, HBM, SRAM).

The transpose operation can be performed based on the different orientations of write and read operations at the local buffer. For example, the neural network hardware accelerator can write rows of the data matrix, which are fetched from the source memory, into rows of the local buffer. After the entire data matrix is written into the memory array, the neural network hardware accelerator can read out columns of the data matrix sequentially from the local buffer and write each column into a row of the destination memory to store the transposed data matrix at the destination memory. After all columns of the data matrix are read out from the local buffer, the neural network hardware accelerator can perform another read operations at the source memory to fetch a new data matrix and store the new data matrix at the local buffer for a new matrix transpose operation.

In the above arrangements, the writing of a new data matrix into the local buffer is put on hold until the read operations of the current data matrix from the local buffer complete, to ensure that the current data matrix is read out before being overwritten with the new data matrix. This can introduce a significant delay between the storage of each new data matrix into the local buffer, which reduces the throughput of the matrix transpose operations and the neural network computations that receive the transposed data matrices.

To improve the throughput of a matrix transpose operation, the neural network hardware accelerator can use two local buffers, including a first local buffer and a second local buffer, to perform matrix transpose operations. Specifically, the neural network hardware accelerator can store rows of a first data matrix to be transposed into the first local buffer and then read out columns of the first data matrix from the first local buffer and store the columns of the first data matrix at rows of the destination memory. While the readout operations at the first local buffer are underway, the neural network hardware accelerator can store rows of a second data matrix to be transposed into the second local buffer. After the transpose operations for the first data matrix at the first local buffer complete, the neural network hardware accelerator can read out columns of the second data matrix from the second local buffer and store the columns of the second data matrix at the destination memory to perform the transpose operation of the second data matrix. As the writing of the second data matrix into the memory array does not need to be delayed to wait for the readout of the first data matrix to complete, the throughput of the matrix transpose operation can be improved. But such arrangements require doubling of memory resources (two local buffers versus a single local buffer) for the matrix transpose operation, which increases not only the footprint but also the power consumption of the memory resources involved in the matrix transpose operation.

Examples of the present disclosure relate to neural network processing and, more specifically, to techniques of accelerating matrix transpose operations to support neural network computations. In some examples, a memory system, which can be part of or coupled with a neural network hardware accelerator, includes a local buffer and a memory access circuit. The local buffer includes an array of memory elements arranged in rows and columns. The memory element may include, for example, a register, or an SRAM device. The memory access circuit can perform write and read operations along alternating dimensions at the local buffer to perform the matrix transpose operations. For example, the memory access circuit can read rows of a first data matrix from a source memory (e.g., DRAM devices, SRAM devices, HBM devices) and perform row write operations to write rows of a first data matrix into the local buffer, followed by column read operations to read columns of the first data matrix from the local buffer. The memory access circuit can write the columns of the first data matrix into rows of a destination memory (e.g., DRAM devices, SRAM devices, HBM devices), to transpose the first data matrix. The memory access circuit can also perform column write operations to write rows of a second data matrix into columns of the local buffer, such that rows of the local buffer store columns of the second data matrix. The memory access circuit can perform a column write operation to write a row of the second data matrix into a column of the local buffer based on determining that a column read operation of the first data matrix at the column of the local buffer completes. The memory access circuit can then perform row read operations at the local buffer to read columns of the second data matrix and store the columns into rows of the destination memory, to transpose the second data matrix.

To support a matrix transpose operation, each memory element of the array of memory elements can include a multiplexor, a demultiplexor, and a storage device (e.g., a register). The multiplexor can select the row and column indices of an entry of the input data array (e.g., first data matrix, third data matrix) to be stored into the storage device, whereas the demultiplexor can select the row and column indices of the entry to receive the output of the storage device. The multiplexor and the demultiplexor can be controlled by the memory access circuit to store a data element of a particular matrix row index and a particular matrix column index (e.g., storage row index=i, storage column index=j) in the input data matrix into a memory element of a particular storage row index and a particular storage column index, and output the data element to an entry in the output data matrix having the storage row index and the storage column index swapped (e.g., storage row index=j, storage column index=i).

The swapping of the storage row and column indices between corresponding entries of an input data matrix and an output data matrix can be controlled based on the dimensions of the read and write operations. In one example, in a row write operation, the multiplexor can be controlled, based on a write control signal indicating the row write operation, to select a data element of an entry of an input data matrix having the same matrix row index and the same matrix column index as the storage row index and storage column index as those of the memory element (e.g., both having row index i and column index j) to be stored in that memory element. In a subsequent column read operation, the demultiplexor can be controlled, based on a read control signal indicating the column write operation, to read a column of the memory array, and map the column back to a row in the destination memory having a row index identical to the column index of the column, which results in swapping of storage row and column indices of the input data matrix for the matrix transpose operation.

The swapping of the row and column indices can also be performed between a column write and a row read operation. Specifically, in a column write operation, the multiplexor can be controlled, based on the write control signal indicating the column write operation, to map a row in the input data matrix to a column of the memory array. A row of the input data matrix can be mapped to a column of the memory array having a storage column index identical to the matrix row index of the row in the input data matrix, which results in swapping of row and column indices for the matrix transpose operation. In a subsequent row read operation, the demultiplexor can be controlled, based on the second control signal indicating the row read operation, to fetch rows from the memory array and store the rows at the destination memory.

With the techniques described above, the write operations of a new data matrix can be performed at the same time as the read operations of the current data matrix. Compared with an arrangement where the write operations of the new data matrix have to be delayed until the read operations of the current data matrix complete, the disclosed techniques can substantially improve the throughput of the matrix transpose operation. In addition, as a single memory array is used to perform the matrix transpose operation, the improvement in the throughput can be achieved without the doubling of power consumption and footprint of memory resources, in contrast to the arrangements where two memory arrays are used for simultaneous read and write operations. All these can improve the performance of the neural network acceleration hardware, which relies on the matrix transpose operations for various neural network computations (e.g., forward propagation operations, backward propagation operations).

In the following description, various examples will be provided. For purposes of explanation, specific configurations and details are set forth to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and can perform a predetermined function based on the prediction. For example, classifier device 100 can be part of an image recognition service provided to identify certain objects (e.g., text, a person) from an image. It is understood that the image recognition service is merely provided as an illustrative example and that techniques disclosed herein can be used for other data processing applications, including, for example, text-based data processing (e.g., processing of search queries) and audio data processing. Moreover, classifier device 100 may operate a number of different prediction models to process different input data, either in parallel or at different times.

In some examples, the image recognition service can be provided in a multi-tenant compute service system. The multi-tenant compute service system typically may include a plurality of servers that can host data and be used by multiple clients or organizations to run instances, such as virtual-machine instances or bare-metal instances (e.g., operating systems that run directly on the server hardware). In most instances, a multi-tenant compute service system may be allocated to a client when the client needs them and decommissioned when the client no longer needs them, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when the client no longer needs it, such that the resources supporting the image recognition service (e.g., access to software application 102, and the underlying hardware resources for processing software application 102) can be reallocated to other clients. Different clients (or one client) may request software application 102 to perform processing of different input data using the same or different prediction models, including prediction model 103.

In the example of FIG. 1, software application 102 can receive pixel data of an image 104 from a user. Image 104 may include an array of pixels. Software application 102 can perform analysis on the pixel data and predict one or more objects 106 depicted in image 104. The analysis may include, for example, comparing the pixel data against a set of predetermined features data. The predetermined features data may include data associated with a set of predetermined visual image features, such as, for example, a nose object or a mouth object. The predetermined features data may also include data associated with non-visual image features, or a combination of visual and non-visual image features. As discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Prediction model 103 can be in the form of an artificial neural network. The artificial neural network may include a plurality of processing nodes, with each processing node configured to process part of the input pixel data or to further process the intermediate outputs from other processing nodes. FIG. 1 illustrates an example of prediction model 103 that uses techniques disclosed herein. In FIG. 1, prediction model 103 may be a multilayer neural network, such as a deep neural network (DNN) or a CNN. Prediction model 103 may include an input layer 207, a set of intermediate layers including intermediate layers 209 and 211, and an output layer (not shown in FIG. 2A). It is understood that prediction model 103 can also include other different types of neural networks, including, for example, long short-term memory (LSTM), multilayer perception (MTP), or multi-scale densenet (MSDNET).

Layer 207 may process pixel data representing different portions of image 104. For example, in the example of FIG. 2A, layer 207 may process the pixel data of image 104. Each processing node of layer 207 is assigned to receive a pixel value (e.g., $x_0, x_1, x_2, \ldots x_n$) corresponding to a predetermined pixel within image 104 and transmit one or more weights with the received pixel value to layer 209. In a case where prediction model 103 is a DNN, each processing node of layer 207, such as nodes 208a and 208b, can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$sum_{210a} = \sum_{i=0}^{n}(W1_i \times x_i) \qquad \text{(Equation 1)}$$

Here, $sum_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207 and then generate a sum (e.g., $Sum_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and it is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 246) can correspond to the output of a processing node of layer 209. In some examples, the pixel data in the input image may be referred to as an input feature map (FMAP) to indicate that the pixels are processed by the same filter (or same sets of filters) corresponding to certain feature(s). The convolution outputs may be referred to as an output FMAP to indicate that the output is the result of processing an input FMAP with the filter.

As shown in FIG. 2B, the convolution operations can be arranged in a sliding-window such that the second rectangular block overlaps, or is otherwise adjacent to, the first rectangular block in the input image. For example, in the illustration of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x \text{ for } x \geq 0 \\ 0 \text{ for } x < 0 \end{cases} \qquad \text{(Equation 2)}$$

In addition to ReLU, other forms of activation function can also be used, including, for example, a softplus function (which can be a smooth approximation of a ReLU function), a hyperbolic tangent function (tan h), an arc tangent function (arctan), a sigmoid function, or a Gaussian function.

A processing node of layer 209 (e.g., processing node 210a) may process the sum with the ReLU function to generate a first output of layer 209 based on the following equation:

$$\text{first\_output}_{210a} = ReLU(Sum_{210a}) \qquad \text{(Equation 3)}$$

Optionally, prediction model 103 may include a pooling layer to reduce the number of intermediate outputs (e.g., $sum_{210a}$) of layer 209. The pooling layer may group the intermediate outputs and perform a pooling operation on each group. The pooling operation may include various kinds of pooling operation such as max pooling (e.g., selecting a maximum intermediate output within the group), min pooling (e.g., selecting a minimum intermediate output), average pooling (e.g., finding an average of each group), or summation pooling (finding a sum of each group), and the reduced intermediate outputs can be processed by the activation function to generate first outputs of layer 209. The pooling operation can be performed to reduce the computation cost associated with activation function processing.

Layer 211 may further process the scaled intermediate outputs from layer 209 by, for example, performing additional convolution operations based on different sets of filters. The outputs from each processing node of layer 211 may be forwarded to other higher intermediate layers or to an output layer (not shown in FIG. 2A). The output layer may form an output vector representing, for example, a probability that certain features are included in image 104 and/or a probability that image 204 includes an image of a panda. For example, the output vector may be compared against a reference vector associated with a nose object of a panda or a reference vector associated with a panda. A decision about whether image 104 is an image of a panda can be determined based on the comparison result.

Figure 2A:
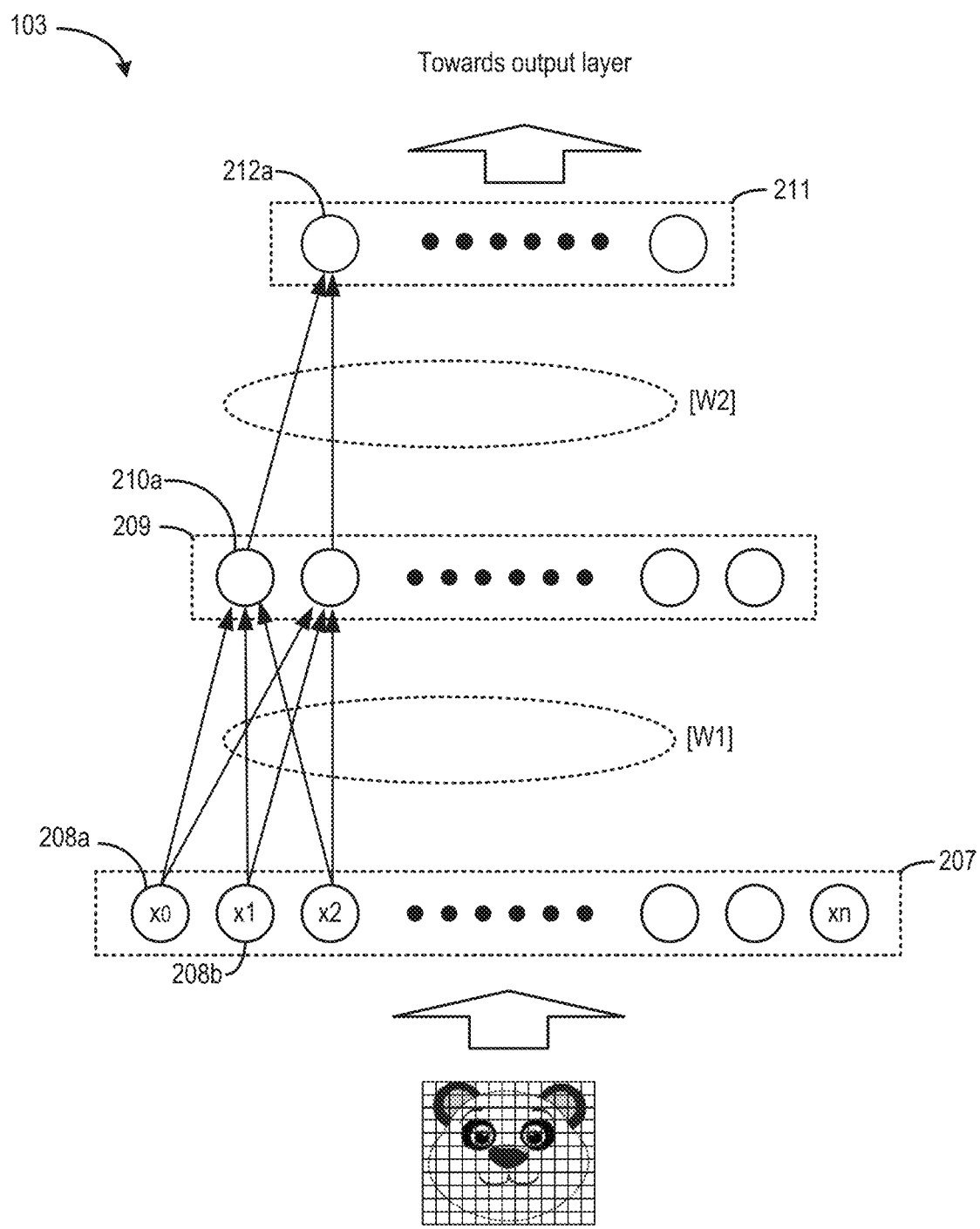
FIGS. 2A-2B are simplified block diagrams illustrating a prediction model and the computations that use techniques disclosed herein, according to certain aspects of the present disclosure.
Figure 2B:
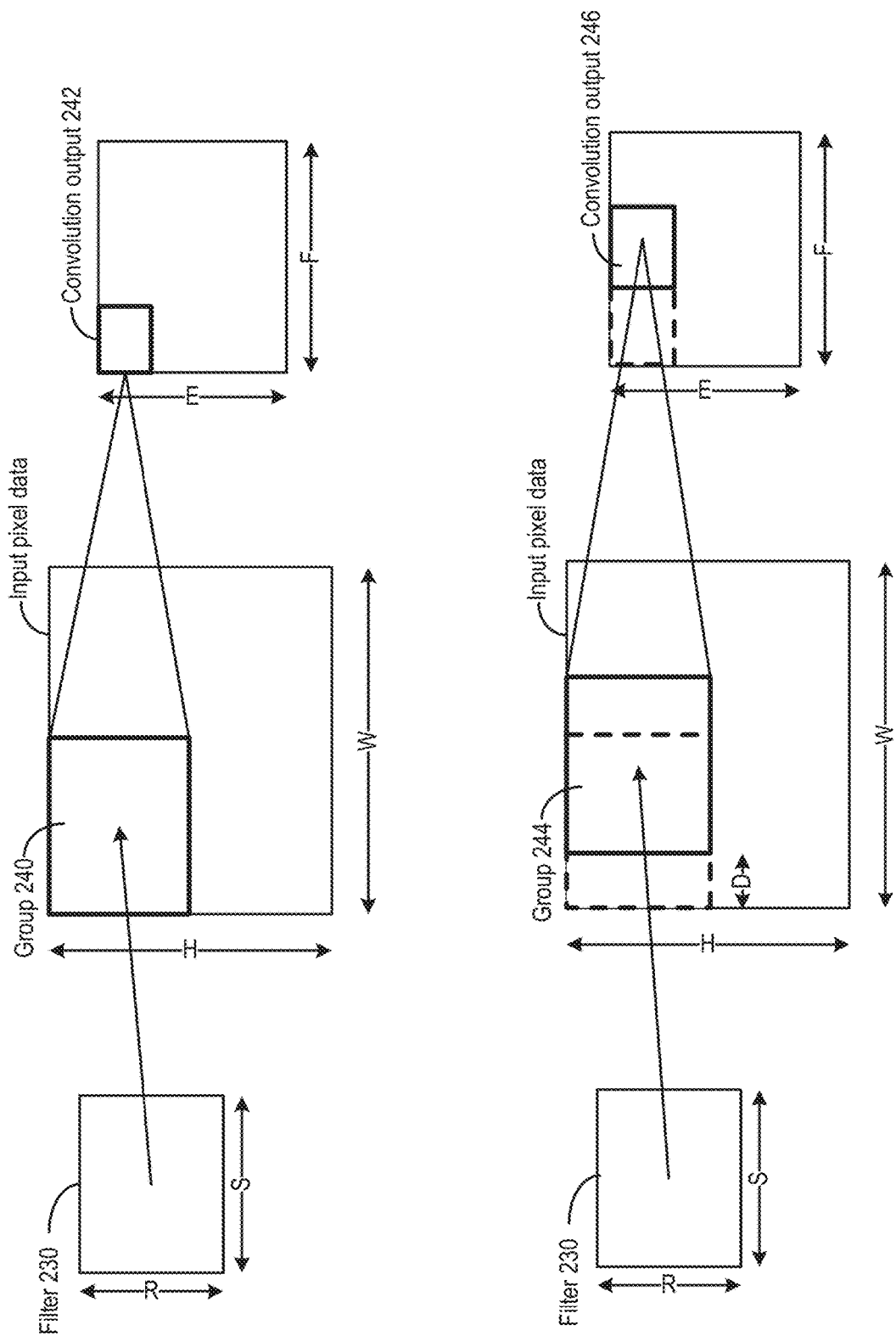

The weights and filter coefficients described in FIG. 2A and FIG. 2B can be generated and updated by a training process, to improve the likelihood of prediction model 103 generating a correct decision. Referring to the examples of FIG. 2A and FIG. 2B, prediction model 103 can be trained based on a set of training images. The training images can include images of different pandas or images of other animals and other artifacts. Prediction model 103 can process those images and generate different output vectors. The weights in the neural network layers of prediction model 103 can be updated to maximize the number of correct decisions (e.g., detection of a panda in training images that contain a panda, non-detection of a panda in training images that do not contain an panda) by the prediction model 103.

Figure 3A:
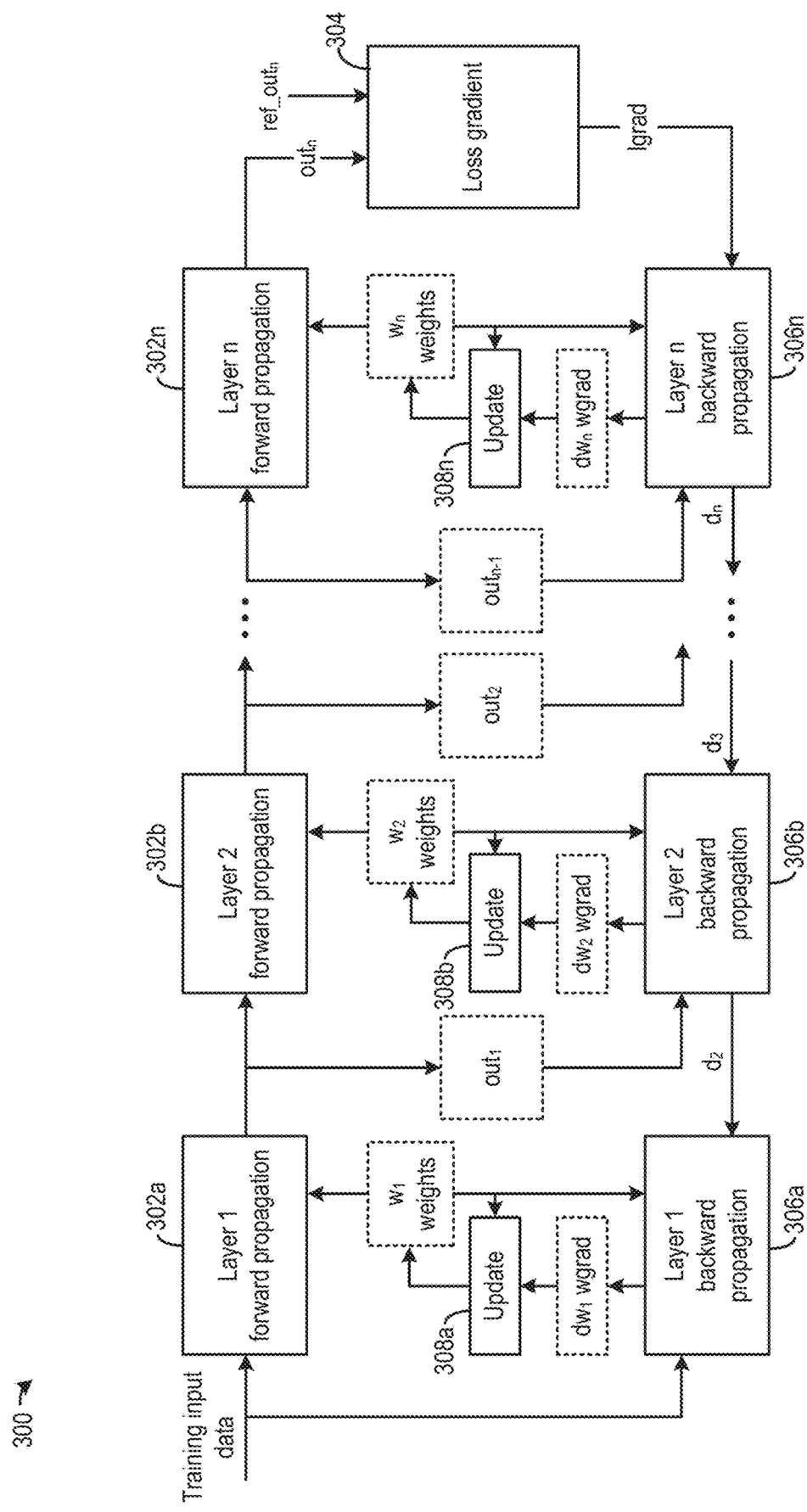

FIG. 3A illustrates an example of a training operation 300 to train a neural network, including the neural network of prediction model 103. A training operation can be performed by, for example, a neural network hardware accelerator that implements the neural network, a general-purpose hardware processor, or other suitable computing systems that support the arithmetic operations involved in neural network processing as described above. The training operation can be based on a gradient descent scheme, which includes forward propagation operations, a loss gradient operation, and backward propagation operations. Specifically, as shown in FIG. 3A, a forward propagation operation can be performed for each neural network layer, such as a forward propagation operation 302a for the lowest layer 1 (which can correspond to input layer 207 of FIG. 2A), a forward propagation operation 302a for layer 2 (which can correspond to layer 209 of FIG. 2A), or a forward propagation operation 302n for the highest layer n (which can correspond to layer 211 of FIG. 2A). A forward propagation operation at a neural network layer can include the multiplication and summation computations between input data and a set of weights for that layer, followed by activation function processing, as described above in Equations 1 and 2, to generate intermediate output data. The intermediate output data can then propagate to the next neural network layer as input to the forward propagation operation at that layer. For example, as shown in FIG. 3A, forward propagation operation 302a can combine training input data with $w_1$ weights of layer 1 to generate intermediate output data $out_1$, which propagate to layer 2 as input. Forward propagation operation 302b can combine data $out_1$ with $w_2$ weights of layer 2 to generate intermediate output data $out_2$, which can then propagate to the next layer. At the highest layer n, forward propagation operation 302n receives intermediate output data $out_{n-1}$ from layer n-1 (not shown in FIG. 3A), combined with $w_n$ weights of layer n, and generates intermediate output data $out_n$.

A loss gradient operation 304 can compare the intermediate output data $out_n$ of layer n against reference output data ref_out$_n$ to generate output error gradients d$_{in}$. The error gradient d$_{in}$ can measure a partial derivative of the output error, represented by the difference between out$_n$ and ref_out$_n$, with respect to each data element of output data out$_n$. In some examples, an objective of the training is to minimize the difference between out$_n$ and ref_out$_n$ such that the error gradients d$_{in}$ can become close to zero.

Following the generation of loss gradients d$_{in}$ by loss gradient operation 304, a backward propagation operation 306 can be performed for each neural network layer. For example, a backward propagation operation 306n can be performed at highest layer n, a backward propagation operation 306b can be performed at layer 2, or a backward propagation operation 306a can be performed at layer 1. A backward propagation operation at a neural network layer can be based on the weights of that neural network layer or the error gradient input to that neural network layer, as well as the input to the forward propagation operation of that layer. For example, for layer n, backward propagation operation 306n can receive, as inputs, weights w$_n$, intermediate output data out$_{n-1}$ (from forward propagation operation at neural network layer n−1), and loss gradients lgrad. The backward propagation operation can perform multiplication and summation computations similar to those of Equations 1 and 2 on the inputs to generate weight gradients wgrad (dw$_n$, dw$_2$, dw$_1$, etc. in FIG. 3A) and output error gradients (d$_n$, d$_3$, d$_2$, etc. in FIG. 3A).

Weight gradients wgrad of a neural network layer can represent a partial derivative of the output error with respect to each weight of the neural network layer, and they can be used to update the weights of the neural network layer. The weight gradients can be generated based on the intermediate outputs of a previous layer and the input error gradients to that neural network layer. For example, at layer n, weight gradients dw$_n$ can be generated based on the intermediate outputs out$_{n-1}$ and loss gradients lgrad, whereas at layer n−1, weight gradients dw$_{n-1}$ can be generated based on the intermediate outputs out$_{n-2}$ and output error gradients of layer n, d$_n$.

The weights at layer n can be updated by an update operation 308 (e.g., update operation 308n for layer n) based on the weight gradients dw$_n$ which are based on the following equation:

$$w_n' = w_n - \alpha \times dw_n \quad \text{(Equation 4)}$$

In Equation 4, w$_n$' can refer to the updated weights w$_n$, whereas α can include a set of predetermined constants.

In addition, the output data gradients of a neural network layer can represent a partial derivative of the output error with respect to the product sums at the neural network layer. The output data gradients can be forwarded to the next-lower neural network layer as inputs to the backward propagation operation in that layer to compute the weight gradients in that layer. For example, as described above, the output data gradients of layer n, d$_n$, can be propagated to layer n−1 to compute weight gradients dw$_{n-1}$. The output data gradients of a neural network layer can be generated based on the input data gradients to that neural network layer, as well as the original weights (prior to being updated with the weight gradients) of that neural network layer. For example, at layer n, the output data gradients d$_n$ can be generated based on weights w$_n$, as well as loss gradients lgrad in backward propagation operation 306n.

The output data gradients d$_n$ generated by layer n can then propagate to the next lower neural network layer n−1 as input to the backward propagation operation at that layer. Backward propagation operation 306b of layer 2 can operate on data gradients d$_3$, weights w$_2$, and intermediate output data out$_1$ to generate output data gradients d$_1$ as well as weight gradients dw$_2$. Weight gradients dw$_2$ can be used by update operation 308b to update w$_2$ weights based on Equation 4. Data gradients d$_2$ can propagate to layer 1. Backward propagation operation 306a of layer 1 can operate on data gradients d$_2$, weights w$_1$, and training input data to generate weight gradients dw$_1$. Weight gradients dw$_1$ can be used by update operation 308a to update w$_1$ weights based on Equation 4.

The training operation of FIG. 3A can involve matrix transpose operations of the data matrices, such as the matrices of weights w$_1$, w$_2$, ... w$_n$, as well as intermediate outputs out$_1$, out$_2$, or out$_{n-1}$. For example, the weight matrix of a neural network layer is combined with inputs to the neural network layer in a forward propagation operation, but in the backward propagation operation of that layer, a transposed version of the weight matrix is combined with an input error gradient matrix (received from the next layer) to compute an output error gradient matrix. For example, referring to FIG. 3A, a transposed version of the matrix of weights w$_n$ at layer n is combined with input error gradient matrix lgrad to generate output error gradient matrix d$_n$. Moreover, a transposed version of the matrix of weights w$_{n-1}$ at layer n−1 is combined with input error gradient matrix d$_n$ to generate output error gradient matrix d$_{n-1}$. The transposed version of the weight matrix is also combined with the weight gradients to adjust the weights based on Equation 4.

FIG. 3B illustrates an example of a transpose operation of a weight matrix. On the left of FIG. 3B, a weight matrix 320 can be a two-dimensional matrix having C columns and M rows and is used in a forward propagation operation. Each entry in weight matrix 320 is associated with an index in the C dimension and an index in the M dimension. For example, W$_{0,1}$ has a matrix row index of 0 in the M dimension and a matrix column index of 1 in the C dimension. A storage index in the C dimension can correspond to a storage column index of a memory element in the memory array, whereas a matrix index in the M dimension can correspond to a storage row index of a memory element in the memory array. Each entry in weight matrix 320 can store a one-dimensional value or a multidimensional matrix.

Referring to the right of FIG. 3B, for a backward propagation, a transposed version of weight matrix 320 can be fetched by the neural network hardware accelerator as weight matrix 322 to combine with, for example, an input error gradient matrix (e.g., lgrad, d$_n$, d$_2$, d$_1$), or weight gradients (dw$_0$, dw$_1$, dw$_n$, etc.). In weight matrix 322, the matrix indices in M dimension and in C dimension are swapped with respect to weight matrix 320, such that a matrix index in the C dimension corresponds to a matrix index in the M dimension of weight matrix 320, and a matrix index in the M dimension of weight matrix 322 corresponds to a matrix index in the C dimension of weight matrix 320. For example, in weight matrix 322, the entry with a matrix row index of 0 and a matrix column index of 1 stores W$_{0,1}$, which has a matrix row index of 1 and a matrix column index of 0 in weight matrix 320. An entry having a matrix row index of M−2 and a matrix column index of C−1 (W$_{M-2,C-1}$) in weight matrix 320 has a matrix row index of C−1 and a matrix column index of M−2 in weight matrix 322.

In addition, in a case where the neural network is configured as a CNN, the intermediate outputs matrix from a forward propagation operation of a neural network layer can also be transposed to combine with the input error gradients matrix (received from the next layer) to generate weight gradients in the backward propagation of that neural network layer. For example, a transposed version of intermediate outputs matrix $out_{m-1}$ combines with the input error gradients matrix $d_n$ to generate weight gradients $dw_n$ used to update the weight matrix $w_n$.

Figure 4A:
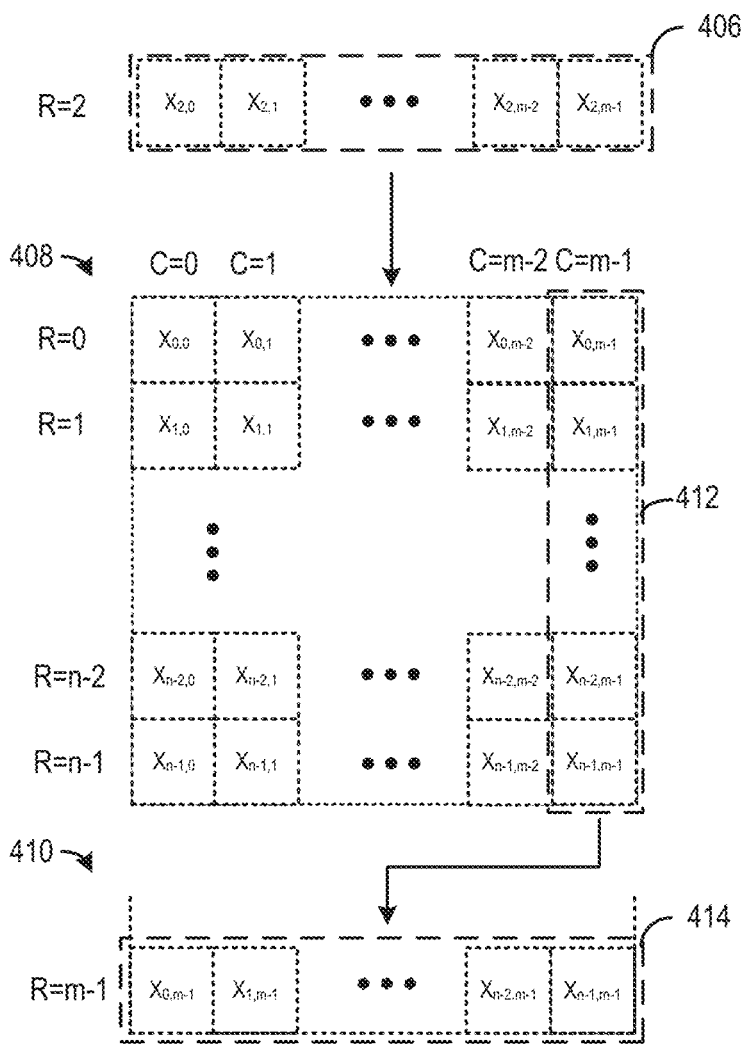
FIGS. 4A-4D illustrate examples of matrix transpose operations, according to certain aspects of the present disclosure.

A neural network hardware accelerator can configure a sequence of read and write operations at a memory array to perform a matrix transpose operation. FIG. 4A illustrates an example sequence 402 of read and write operations. As shown in FIG. 4A, a neural network hardware accelerator can write rows of a data matrix, including a row 406 having a matrix row index of 2, into rows of a memory array 408. Memory array 408 can have m columns and n rows of memory elements, where each memory element can store a one-dimensional value or a multidimensional matrix.

After the entirety of the data matrix is written into memory array 408, the neural network hardware accelerator can read out columns of the data matrix sequentially from columns of memory array 408 and write each column into a row of a destination memory 410 to transpose the data matrix. Each entry in the data matrix having a matrix row index r and a matrix column index c can be stored in a memory element of destination memory 410 having a row index c and a column index r (i.e., storage row index and storage column index swapped with respect to matrix row index and matrix column index). For example, column 412 of the data matrix having the matrix column index m–1 is written into a row 414 of destination memory 410, with row 414 being associated with a storage row index (R) of m–1. After all columns of the data matrix in memory array 408 are read, the neural network hardware accelerator can overwrite the data matrix with a new data matrix in memory array 408 to perform a new matrix transpose operation.

Figure 4B:
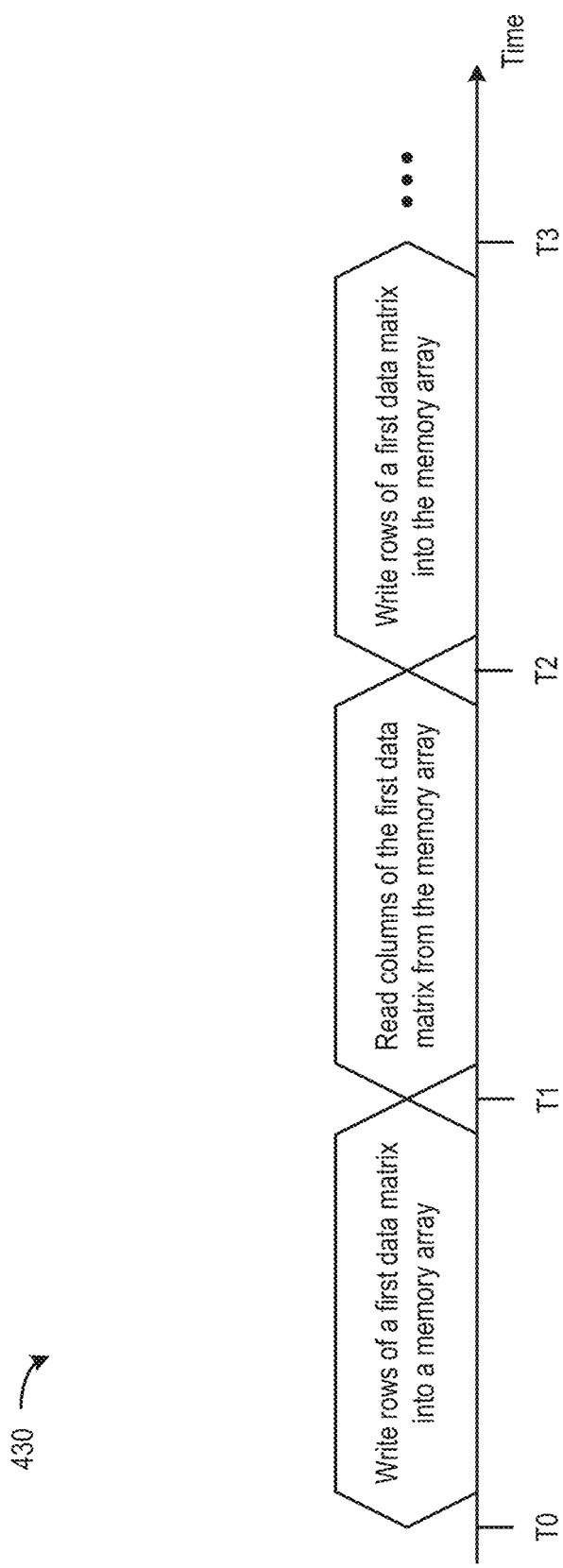

FIG. 4B illustrates an example timing diagram 430 of sequence 402 of read and write operations in FIG. 4A. As shown in FIG. 4B, rows of a first data matrix are written into memory array 408 between times T0 and T1. Between times T1 and T2, columns of the first data matrix are read from memory array 408 and stored into rows of destination memory 410 to generate a transposed version of the first data matrix. After all columns of the first data matrix are read, rows of a second data matrix are then written into memory array 408 between times T2 and T3. In the arrangements of FIG. 4B, the writing of a new data matrix into the memory array is put on hold until the read operations of the current data matrix complete, to ensure that the current data matrix is read out before being overwritten with the new data matrix. This can introduce a significant delay between the storage of each new data matrix into the memory array, which reduces the throughput of the matrix transpose operations and the neural network computations that receive the transposed data matrices.

Figure 4C:
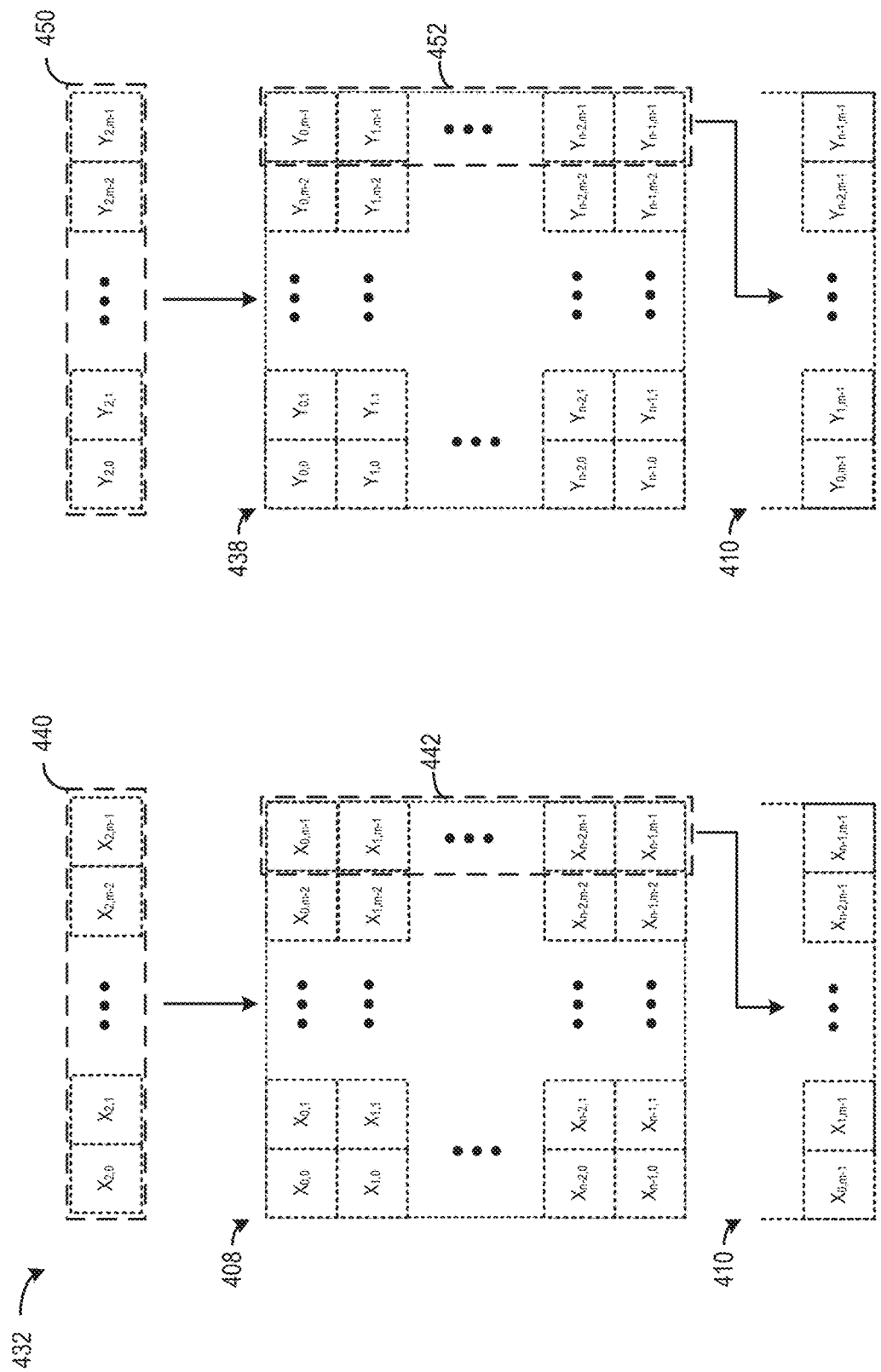

FIG. 4C illustrates another example sequence 432 of read and write operations that can improve the throughput of the matrix transpose operation. As shown in FIG. 4C, two memory arrays, including memory array 408 and memory array 438, can be used to perform matrix transpose operations. Specifically, the neural network hardware accelerator can store rows of a first data matrix to be transposed, including row 440, into memory array 408, and then read out columns of the first data matrix, including column 442, from memory array 408, and write the columns into rows of destination memory 410 to transpose the first data matrix.

While the readout operation at memory array 408 is underway, the neural network hardware accelerator can store rows of a second data matrix to be transposed, including row 450, into memory array 438. After the transposed first data matrix is read out and fetched from destination memory 410, the neural network hardware accelerator can read out columns of the second data matrix from memory array 438, including column 452, from memory array 438, and write the columns of the second data matrix into rows of destination memory 410 to perform the transpose operation of the second data matrix to transpose the second data matrix.

Figure 4D:
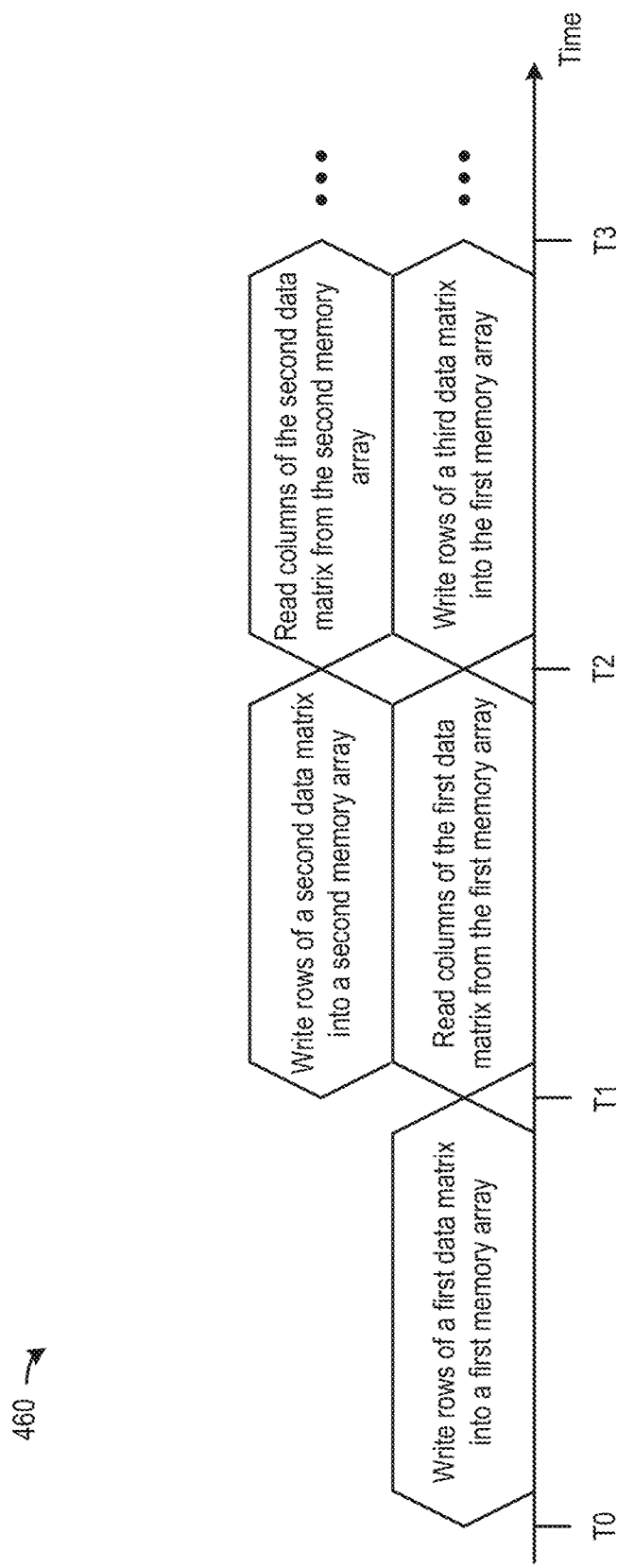

FIG. 4D illustrates an example timing diagram 460 of sequence 432 of read and write operations in FIG. 4C. As shown in FIG. 4D, rows of the first data matrix are written into a first memory array (e.g., memory array 408) between times T0 and T1. Between times T1 and T2, columns of the first data matrix are read from memory array 408 and stored into rows of destination memory 410 to generate a transposed version of the first data matrix. Moreover, between times T1 and T2, rows of the second data matrix are written into a second memory array (e.g., memory array 438). Between times T2 and T3, after all columns of the first data matrix are read, rows of a third data matrix can be written into memory array 408. Meanwhile, columns of the second data matrix can also be read from memory array 438 and stored into rows of destination memory 410 to generate a transposed version of the second data matrix. As the writing of the second data matrix into the memory array does not need to be delayed to wait for the readout of the first data matrix to complete, the throughput of the matrix transpose operation can be improved. But such arrangements require doubling of memory resources (two memory arrays versus a single memory array) for the matrix transpose operation, which increases not only the footprint but also the power consumption of the memory resources involved in the matrix transpose operation.

Figure 5A:
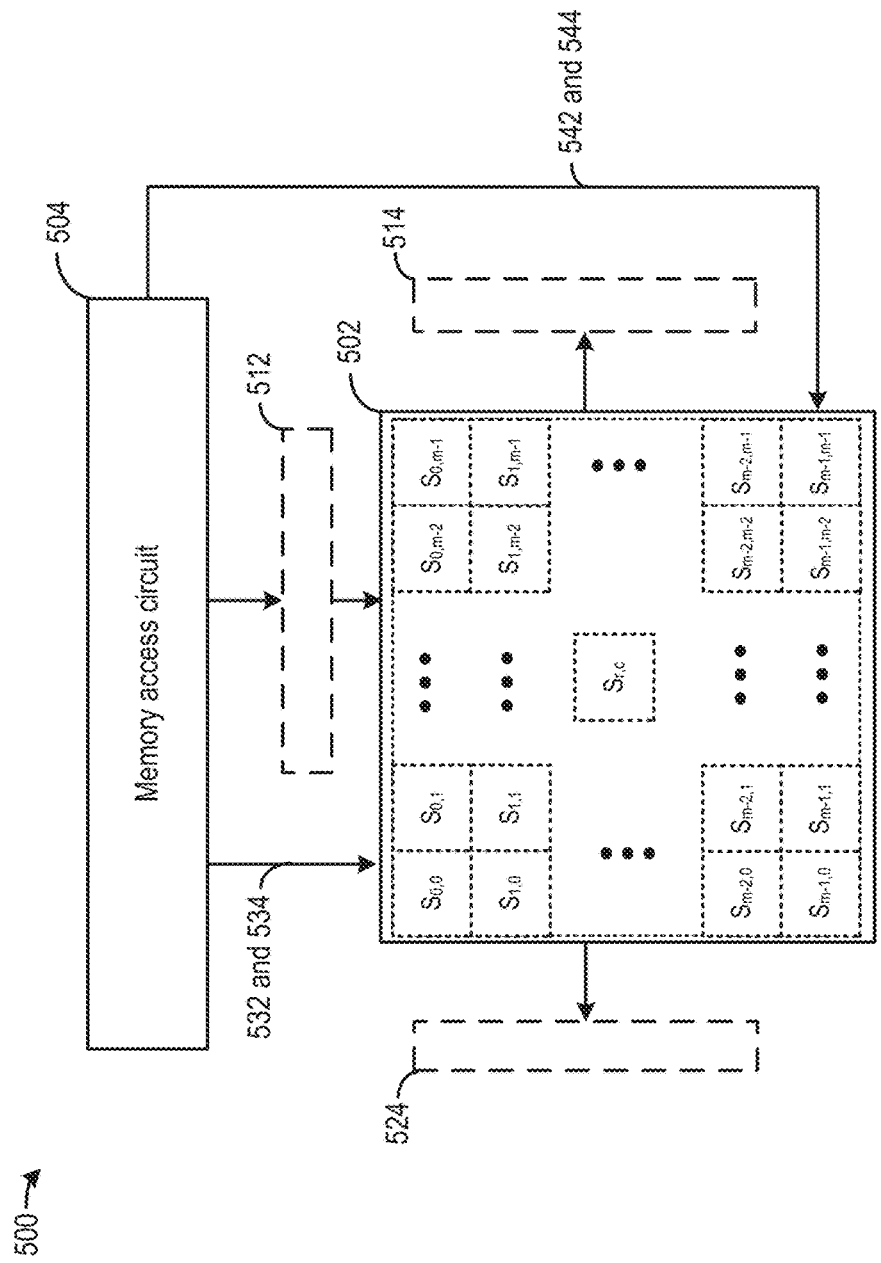
FIGS. 5A-5C illustrate a memory system for matrix transpose operations, according to certain aspects of the present disclosure.
Figure 5B:
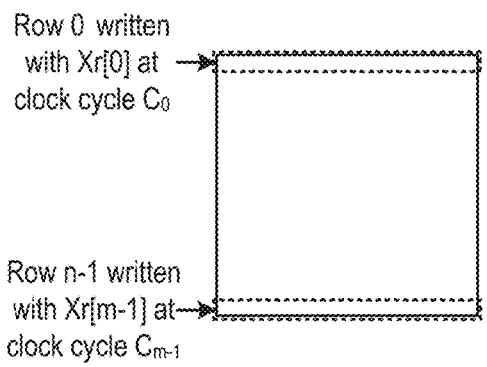
Figure 5B:
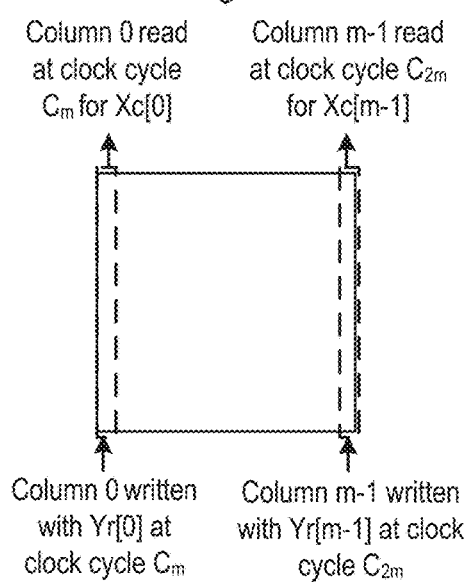
Figure 5B:
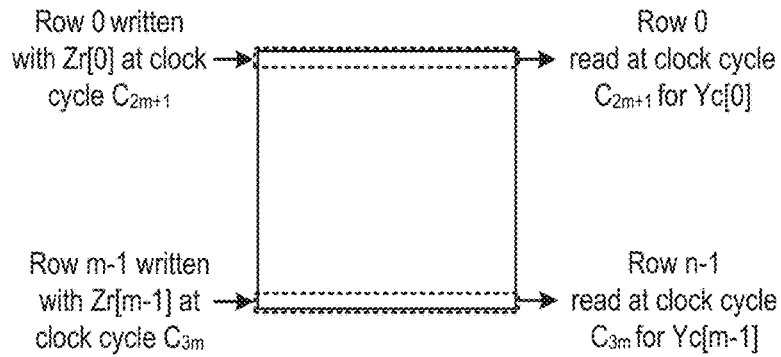
Figure 5C:
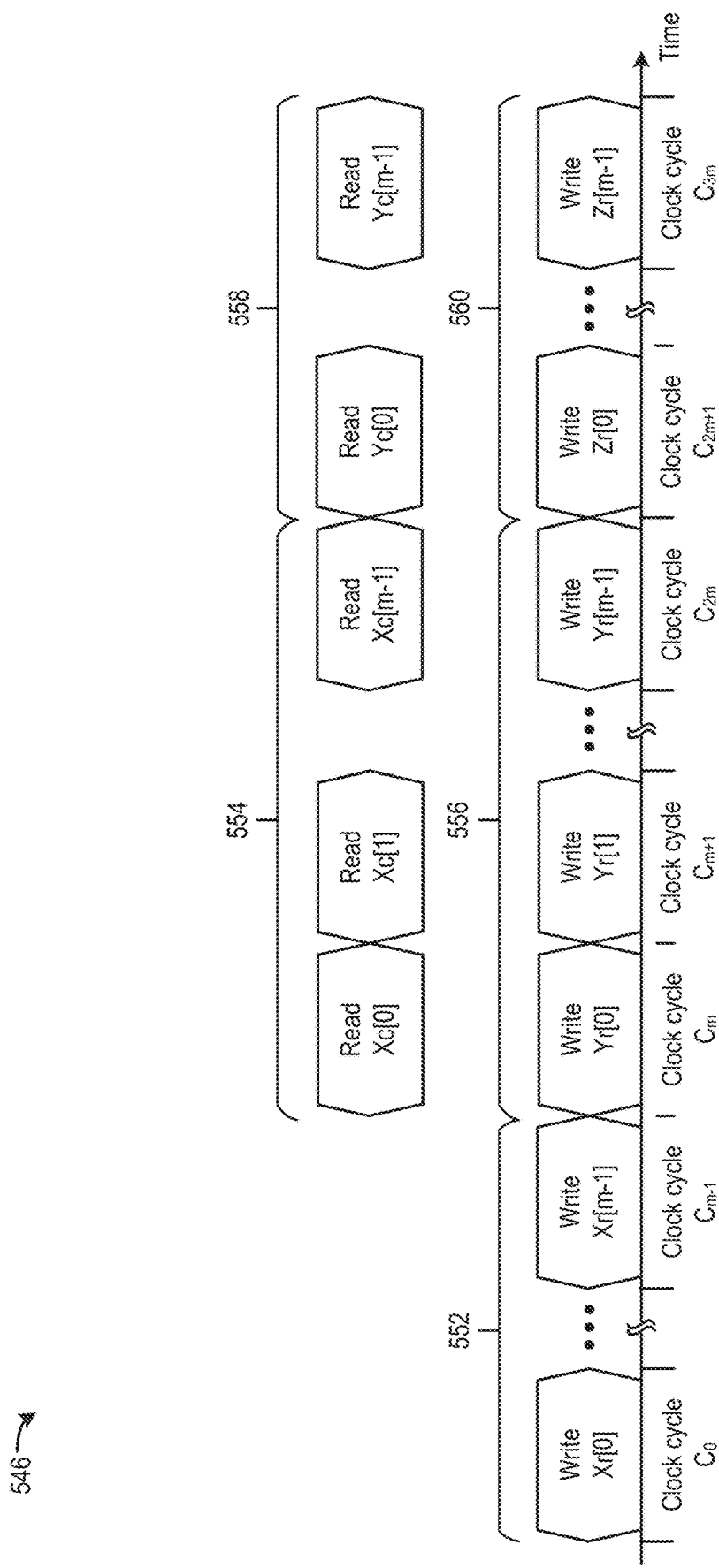

FIG. 5A-FIG. 5C illustrate examples of a memory system 500 that can accelerate matrix transpose operations to support neural network computations while addressing at least some of the issues above. Memory system 500 can be part of or coupled with a neural network hardware accelerator. As shown in FIG. 5A, memory system 500 includes a memory array 502 and a memory access circuit 504. Memory array 502 includes an array of memory elements arranged in two dimensions, including a row dimension and a column dimension. In FIG. 5A, memory array 502 includes m columns and n rows, with each memory element $S_{r,c}$ being associated with a row index r and a column index c. Each memory element can store a data element, which can include a number, multiple numbers, or numbers organized into a matrix. In some examples, memory system 500 can be part of a local buffer of a neural network hardware accelerator configured to perform matrix transpose operations for the neural network accelerator. In some examples, each memory element $S_{r,c}$ can include an on-chip storage device that is on the same chip as the neural network hardware accelerator, such as, for example, registers that operate based on periodical clock signals or SRAM devices. In some examples, each memory element $S_{r,c}$ can also include an off-chip storage device that is external to that chip and that includes the neural network hardware accelerator, such as, for example, DRAM devices or HBM devices.

In a case where the storage device includes a set of registers, each register can perform a read operation to fetch the stored data one clock cycle after the data is stored into the register, to ensure that the read operation fetches the most-recently stored data. For example, in a case where the registers include edge-triggered flip-flops, a register can store the data at a rising clock edge of a clock cycle. A read operation of the stored data can then be performed after a subsequent falling clock edge that signals the beginning of the next clock cycle, to ensure that the data is written into the flip-flop when the read operation begins. On the other hand, a write operation can be performed to store new data into the register in the same clock cycle as a read operation to fetch the currently stored data. For example, in a case where the register stores the new data on a rising clock edge, the currently stored data can be read in the first half of a clock cycle before the rising clock edge, and the currently stored data can be overwritten with the new data at and after the rising clock edge of the same clock cycle.

Memory access circuit 504 can perform write and read operations at memory array 502 along alternating dimensions to perform matrix transpose operations. For example, memory access circuit 504 can perform a sequence of row write operations to store rows 512 of a first data matrix, provided by an input memory (e.g., DRAM), into rows of memory array 502, followed by a sequence of column read operations to retrieve columns 514 of the first data matrix from memory array 502, and store the columns at an output memory (e.g., destination memory 410) to form a second data matrix as a transposed version of the first data matrix, where the matrix row indices and matrix column indices of each data element of the first data matrix are swapped. In addition, memory access circuit 504 can perform a sequence of column write operations to store rows 512 of a third data matrix (provided by the input memory) into columns of memory array 502, followed by a sequence of row read operations of the third data matrix from memory array 502 to retrieve columns 524 of the third data matrix, and store the columns at the rows of the output memory to form a fourth data matrix as a transposed version of the third data matrix. As described below, memory access circuit 504 can provide a write control signal 532 to memory array 502 to indicate whether a row write operation or a column write operation is to be performed, as well as indicate the storage row index/column index 534 of the row/column of the memory elements to be written. Moreover, memory access circuit 504 can provide a second read control signal 542 to memory array 502 to indicate whether a row read operation and a column read operation are to be performed, as well as indicate the storage row index/column index 544 of the row/column of the memory elements to be read.

In the following figures, it is assumed that memory array 502 comprises a square array of m×m memory elements and that the data matrices (e.g., first data matrix, third data matrix) provided by the input memory and stored into memory array 502 have the same dimension (m×m) as memory array 502. It is understood that memory array 502 can also be used to transpose a data matrix having fewer rows and/or columns than memory array 502. In such a case, zero padding can be performed at rows and/or columns of the input data matrix so that the zero-padded data matrix has the same dimension (m×m) as memory array 502, and then the aforementioned row/column read and write operations can be performed at memory array 502 to transpose the zero-padded data matrix.

FIG. 5B illustrates example sequences of read and write operations at memory array 502 by memory access circuit 504 to perform matrix transpose operations, while FIG. 5C illustrates an example timing diagram 546 of the sequences of read and write operations. Referring to FIG. 5B, a sequence of row write operations 552 can be performed, with each row read operation to store a row Xr of a first data matrix X into a row of memory array 502. The rows of the first data matrix can be stored sequentially into rows of memory array 502 in the sequence of row write operations 552. Row 0 of memory array 502 can store row Xr[0], wherein row m−1 of memory array 502 can store row Xr[m−1] of the first data matrix X. During row write operations 552, memory access circuit 504 can transmit write control signal 532 having a row write flag asserted to memory array 502 to indicate that row write operations are performed.

Referring to FIG. 5C, assuming that the storage devices of memory array 502 comprise registers that can be written in one clock cycle, each row of memory array 502 can complete a row write operation in one clock cycle. Row Xr[0] can be written to row 0 of memory array 502 in clock cycle $C_0$, followed by row Xr[1] of row 1 written in clock cycle $C_1$ (not shown in the figures), and row Xr[m−1] can be written to row m−1 in clock cycle $C_{m-1}$. Accordingly, the sequence of row write operations 552 can take place from clock cycle $C_0$ to clock cycle $C_{m-1}$.

Referring back to FIG. 5B, after the sequence of row write operations 552 completes, memory access circuit 504 can perform a sequence of column read operations 554 to fetch columns Xc of the first data matrix. The columns Xc of the first data matrix can be stored in rows of a destination memory (e.g., destination memory 410) having storage row indices matching the matrix column indices of the columns of the first data matrix to swap the matrix row and column indices of the first data matrix for the transpose operation, as shown in FIG. 4A above. In one example, the first data matrix can be traversed from a start column associated with the largest column index to an end column associated with the smallest column index, into a row of the destination memory. Specifically, column 0 of memory array 502 can be read to fetch a column Xc[0] of the first data matrix, and column Xc[0] can be stored in a row of storage row index 0 of the destination memory. Moreover, column m−1 of memory array 502 can be read to fetch a column Xc[m−1] of the first data matrix X, and column Xc[m−1] can be stored in a storage row of row index m−1 of the destination memory, to form a second data matrix that is a transposed version of the first data matrix X. During column read operations 554, memory access circuit 504 can transmit read control signal 542 having a row_read flag de-asserted to memory array 502 to indicate that column read operations are performed.

Referring back to FIG. 5C, the sequence of column read operations 554 can start in clock cycle $C_m$, in which column m−1 can be read to fetch column Xc[m−1] of the first data matrix. The sequence of column read operations 554 can start one clock cycle after clock cycle $C_{m-1}$, in which the row Xr[m−1] of the first data matrix X is written into row m−1 of memory array 502, to ensure that the column read operations fetch data elements of the first data matrix. Column 0 of memory array 502 can be read in clock cycle $C_m$ to fetch column Xc[0] of the first data matrix X, whereas column m−1 can be read to fetch column Xc[m−1] in clock cycle $C_{2m}$. Accordingly, the sequence of column read operations 554 can take place from clock cycle $C_n$ to clock cycle $C_{2m}$ to fetch m columns of data.

In addition, as soon as a column read operation completes at a column of memory array 502, a column write operation can proceed to store a row of a new data matrix into the column of memory array 502. In some examples, the column read operations and the column write operations can be performed sequentially but within the same time period. For example, referring to FIG. 5B, within the same time period as when the sequence of column read operations 554 is performed (between clock cycle $C_n$ to clock cycle $C_{2m}$), memory access circuit 504 can also perform a sequence of column write operations 556 to store rows Yr of a third data matrix Y into columns of memory array 502. A row Yr can be stored to a column of memory array 502 having a storage column index matching the row index of row Yr. For example, column m−1 of memory array 502 can store row Yr[m−1] (having row index m−1) and column m−2 of memory array 502 can store row Yr[m−2] (not shown in FIG. 5B), whereas column 0 of memory array 502 can store row Yr[0]. During column write operations 556, memory access circuit 504 can transmit write control signal 532 having a row_write flag de-asserted to memory array 502 to indicate that column write operations are performed. The storing of rows Yr of the third data matrix into columns of memory array 502, with row and column indices swapped, can create the effect of transposing the third data matrix.

Referring to FIG. 5C, each column write operation 556 and each column read operation 554 can be performed within the same time period (e.g., within the same clock cycle), and pairs of column write operation and column read operation can be performed in consecutive clock cycles starting from clock cycle $C_m$ to clock cycle $C_{2m}$. For example, within clock cycle $C_m$, memory access circuit 504 can perform a column write operation 556 to write row Yr[0] at column 0 of memory array 502, as well as a column read operation 554 to fetch column Xc[0] from same column 0. These are followed by clock cycle $C_{m+1}$, in which memory access circuit 504 can perform a column write operation 556 to write row Yr[1] at column 1, as well as a column read operation 554 at the same column to fetch column Xc[1]. Further, in clock cycle $C_{2m}$, memory access circuit 504 can perform a column write operation 556 at column m−1 of memory array 502 to write row Yr[m−1], as well as a column read operation 554 at the same column 0 to fetch column Xc[m−1]. As described above, the column read operation can be performed in the first half of a clock cycle prior to a clock edge (e.g., a rising clock edge) to fetch column Xc, and the column write operation can be performed at the clock edge to store a row Yr.

After the sequence of column write operations 556 completes, memory access circuit 504 can perform a sequence of row read operations 558. A row of memory array 502 can store a column of the third data matrix Yc that corresponds to a row of the transposed third data matrix. The rows fetched from memory array 502 can be stored in the rows of destination memory 502 to form a fourth data matrix, which is a transposed version of the third data matrix. Specifically, row 0 of memory array 502 can be read to fetch a column Yc[0] of the third data matrix, and row Yc[0] can be stored in a row of storage row index 0 of the destination memory. Moreover, row n−1 of memory array 502 can be read to fetch a column Yc[m−1] of the third data matrix, and row Yc[m−1] can be stored in a row of storage row index m−1 of the destination memory, to form the fourth data matrix. During row read operations 558, memory access circuit 504 can transmit read control signal 542 having a row_read flag asserted to memory array 502 to indicate that row read operations are performed.

In addition, within the same time period as when the sequence of row read operations 558 is performed (between clock cycle $C_{2m+1}$ and clock cycle $C_{3m}$), memory access circuit 504 can perform a sequence of row write operations 560 to store rows of a fifth data matrix Z into rows of memory array 502. Row 0 of memory array 502 can store row Zr[0] and row 1 of memory array 502 can store row Zr[1] (not shown in FIG. 5B), whereas row m−1 of memory array 502 can store row Zr[m−1]. During row write operations 560, memory access circuit 504 can transmit write control signal 532 having a row_write flag asserted to memory array 502 to indicate that row write operations are performed. Referring to FIG. 5C, each row read operation 558 and row write operation 560 can be performed with the same clock cycle, and pairs of column write operation and column read operation can be performed in consecutive clock cycles starting from clock cycle $C_{2m+1}$ to clock cycle $C_{3m}$. During row write operations 560, memory access circuit 504 can transmit write control signal 532 having a row_write flag asserted to memory array 502 to indicate that row write operations are performed. Following the completion of the sequence of row write operations 560, a second sequence of column read operations can be performed to obtain a transposed version of the fifth data matrix.

In the example of FIG. 5B and FIG. 5C, it is shown that a write operation to a row/column of memory array 502 follows immediately after a read operation to the same row/column of memory array 502 (e.g., within the same clock cycle), but this is not required. Under certain operation conditions, the write operation to a particular row/column can be performed after read operations to other row/columns have been completed. For example, referring to FIG. 5B, memory access circuit 504 can perform read operations at columns 0, 1, and 2 of memory array 502 to obtain Xc[0], Xc[1], and Xc[2]. At the same clock cycle in which column 2 is read to fetch Xc[2], memory access circuit 504 can write Yr[0] at column 0 of memory array 502. This can happen when, for example, the fetching of the new data matrix from the input memory lags behind the fetching of the transposed data matrix from memory array 502. In such a case, the read operations from memory array 502 can proceed first to ensure the data elements in memory array 502 are fetched to output memory, before those data elements are overwritten by the subsequent write operations to store the new data matrix.

With the arrangements of FIG. 5A-FIG. 5C, the write operations of a new data matrix can be performed at the same time as the read operations of the current data matrix. Compared with an arrangement where the write operations of the new data matrix have to be delayed until the read operations of the current data matrix complete, the disclosed techniques can substantially improve the throughput of the matrix transpose operation. In addition, as a single memory array is used to perform the matrix transpose operation, the improvement in the throughput can be achieved without the doubling of power consumption and footprint of memory resources, in contrast to the arrangements where two memory arrays are used for simultaneous read and write operations. All these can improve the performance of the neural network acceleration hardware that relies on the matrix transpose operations for various neural network computations (e.g., forward propagation operations, backward propagation operations).

Figure 6:
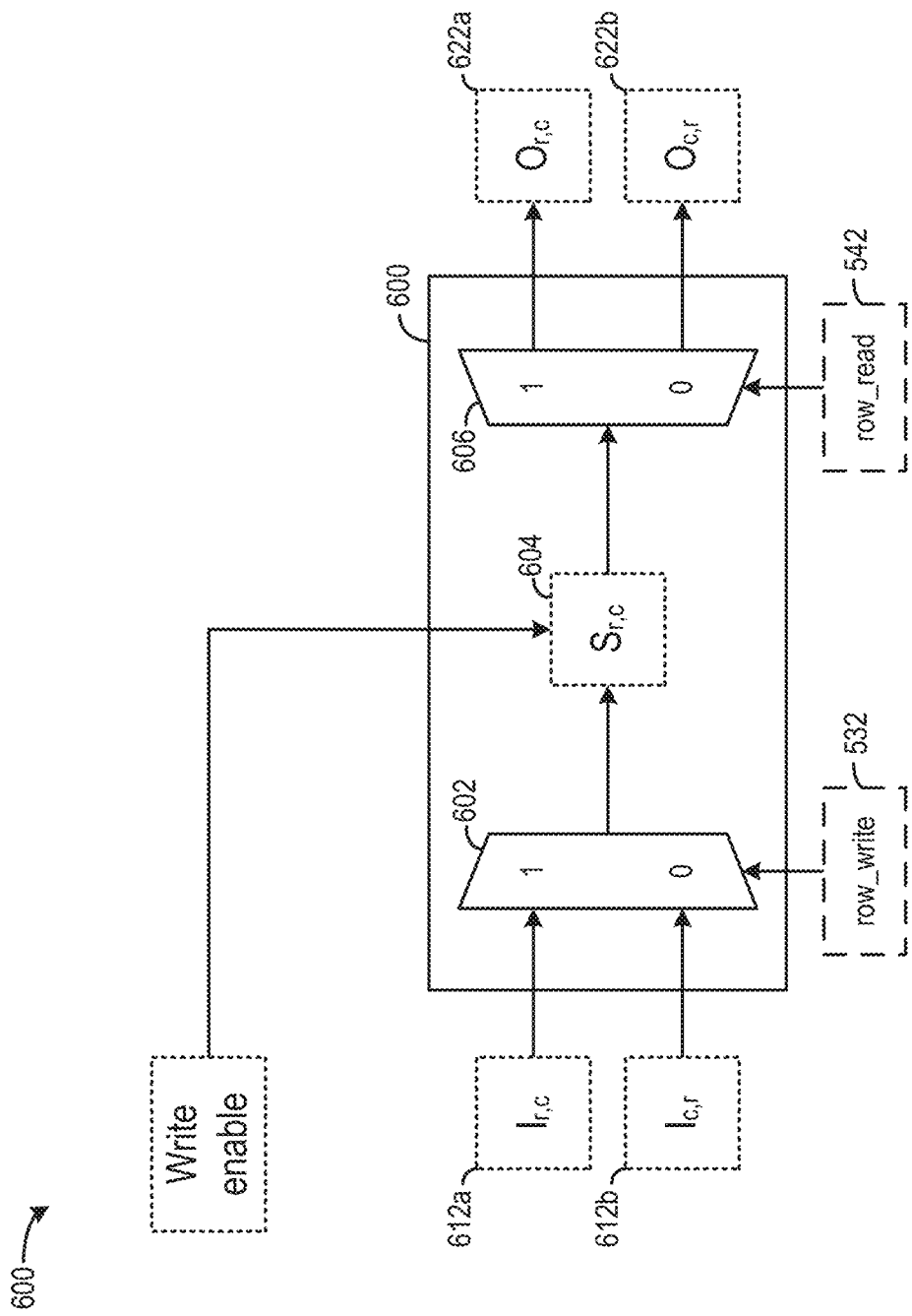
FIGS. 6, 7A, and 7B illustrate examples of internal components of the memory system of FIGS. 5A-5C, according to certain aspects of the present disclosure.

FIG. 6 illustrates example internal components of a memory element 600, which can be part of memory array 502. As shown in FIG. 6, memory element 600 may include a multiplexor 602, a storage device 604, and a demultiplexor 606. Memory element 600 and storage device 604 (labeled $S_{r,c}$) can be associated with a storage row index r and a storage column index c in memory array 502. Multiplexor 602 of memory element 600 can be connected to a first input memory element 612a and a second input memory element 612b of an input memory (e.g., a DRAM that stores an input data matrix to be transposed), to select a source of data to be stored in storage device 604. Moreover, demultiplexor 606 can be connected to a first output memory element 622a and a second output memory element 622b of an output memory (e.g., destination memory 410), to select a destination of the data stored in storage device 604.

Specifically, multiplexor 602 can select, based on write control signal 532, one of first input memory element 612a or second input memory element 612b to provide data for storage in storage device 604. First input memory element 612a, labeled $I_{r,c}$, has the same storage row index (r) and storage column index (c) as, respectively, the storage row index and the storage column index of memory element 600, while second input memory element 612b, labeled $I_{c,r}$, has the storage row and storage column indices swapped with respect to those of memory element 600. When write control signal 532 indicates a row write operation, multiplexor 602 can select data in first input memory element 612a for storage in storage device 604. When write control signal 532 indicates a column write operation, multiplexor 602 can select data in second input memory element 612b for storage in storage device 604, thereby swapping the storage row and column indices of the input data matrix to perform the transpose operation. Storage device 604 may also receive a write enable signal to enable the storage device to store the data from one of first input memory element 612a or second input memory element 612b.

In addition, demultiplexor 606 can select, based on read control signal 542, one of first output memory element 622a or second output memory element 622b to output the data stored in storage device 604. First output memory element 622a, labeled $O_{r,c}$, has the same storage row index (r) and storage column index (c) as the storage row and storage column indices of memory element 600, while second output memory element 622b, labeled $O_{c,r}$, has the storage row index and storage column index matching, respectively, the storage column index and the storage row index of memory element 600, hence with storage row and column indices swapped. When read control signal 542 indicates a row read operation, demultiplexor 606 can select first output memory element 622a to receive the data stored in storage device 604. As described above, a column write operation performs the storage row and column indices swapping, so a row read operation that follows the column write operation does not swap the storage row and column indices again. On the other hand, when read control signal 542 indicates a column read operation, demultiplexor 606 can select second output memory element 622b to receive the data stored in storage device 604. As second output memory element 622b has row and column indices swapped with respect to memory element 600, the data matrix stored in the output memory can become a transposed version of the data matrix stored in memory array 502.

Figure 7A:
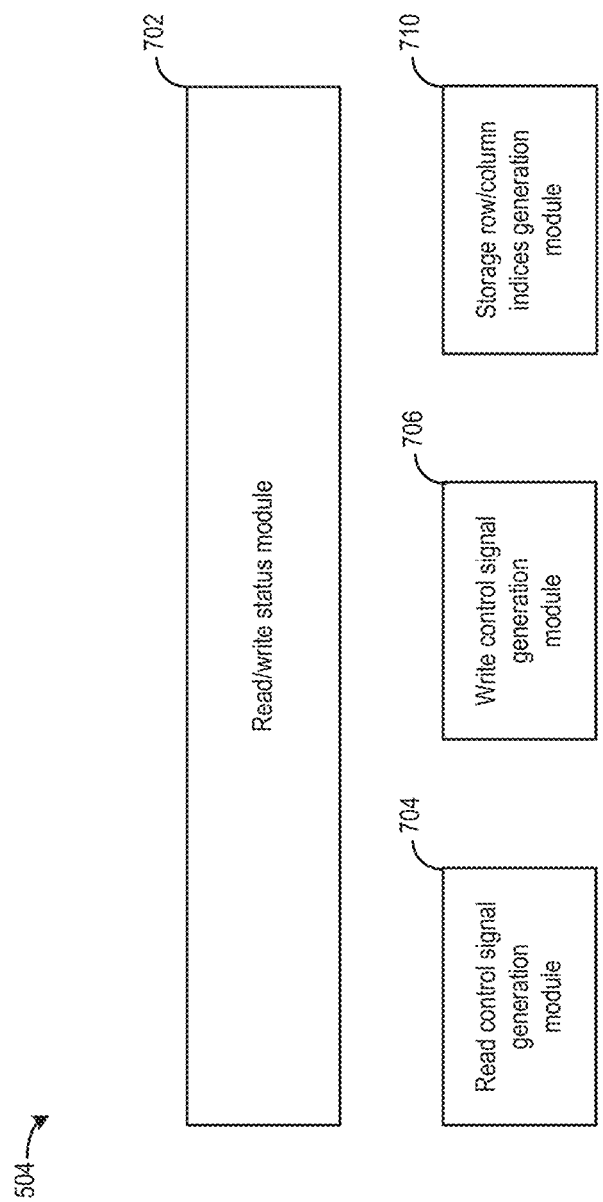
Figure 7B:
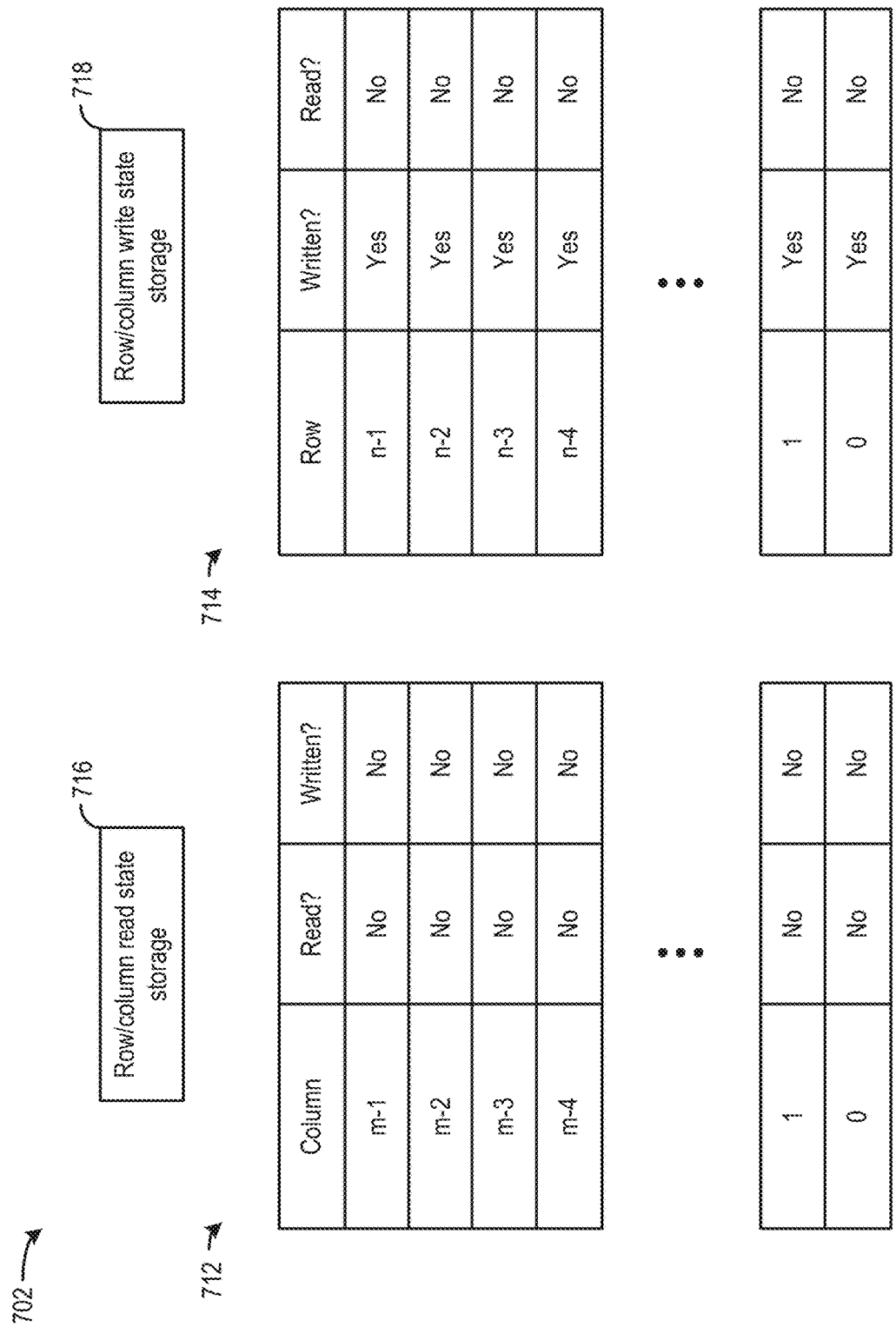

FIG. 7A and FIG. 7B illustrate example components of memory access circuit 504. As shown in FIG. 7A, memory access circuit 504 includes a read/write status module 702, a read control signal generation module 704, a write control signal generation module 706, and a storage row/column indices generation module 710. Each module in memory access circuit 504 can be implemented as, for example, a software module or a digital circuit module (e.g., field-programmable gate array).

Read control signal generation module 704 can generate read control signal 542 to indicate whether a row read operation or a column read operation is performed. Moreover, write control signal generation module 706 can generate write control signal 532 to indicate whether a row write operation or a column write operation is performed. Further, storage row/column indices generation module 710 can generate row/column indices 534 and 544 to select a row or a column for the row write/read or column write/read operations. In addition, read/write status module 702 can maintain status and a current state of dimension (row/column) of read and write operations. The status and dimension state information can be provided to read control signal generation module 704, write control signal generation module 706, and storage row/column indices generation module 710 to generate, respectively, read control signal 542, write control signal 532, and row/column indices 534 and 544.

FIG. 7B illustrates example internal structure of read/write status module 702. Specifically, read/write status module 702 includes a column status table 712, a row status table 714, a row/column read state storage 716, and a row/column write state storage 718. As shown in FIG. 7B, column status table 712 stores a read status and a write status for each column of memory array 502, whereas row status table 714 stores a read status and a write status for each row of memory array 502. Memory access circuit 504 can control the read and write operations, as well as the storage row/column indices of the rows/columns of memory array 502 for the read and write operations, based on the read and write statuses. For example, upon determining, based on row status table 714, that the row write operations complete, memory access circuit 504 can start column read operations, as well as column write operations, starting at column m−1 one clock cycle after row write operations complete, and update column status table 712 accordingly. Memory access circuit 504 can also update row/column read state storage 716 and read/column write state storage 718 to indicate, respectively, a column read operation and a column write operation. Read control signal generation module 704 and write control signal generation module 706 can also generate, respectively, read control signal 542 indicating a column read operation and write control signal 532 indicating a column write operation. As memory access circuit 504 traverses through column status table 712, storage row/column indices generation module 710 can also generate a sequence of column indices to select columns of memory array 502 for the column read/write operations.

After the column read/write operations complete, memory access circuit 504 can start row read operations, as well as row write operations, starting at row 0 one clock cycle after column write operations complete, and update row status table 714 accordingly. Memory access circuit 504 can also toggle the dimension state in row/column read state storage 716 and read/column write state storage 718 to indicate, respectively, a row read operation and a row write operation. Read control signal generation module 704 and write control signal generation module 706 can also generate, respectively, read control signal 542 indicating a row read operation and write control signal 532 indicating a row write operation. As memory access circuit 504 traverses through row status table 714, storage row/column indices generation module 710 can also generate a sequence of storage row indices to select rows of memory array 502 for the row read/write operations.

Figure 8:
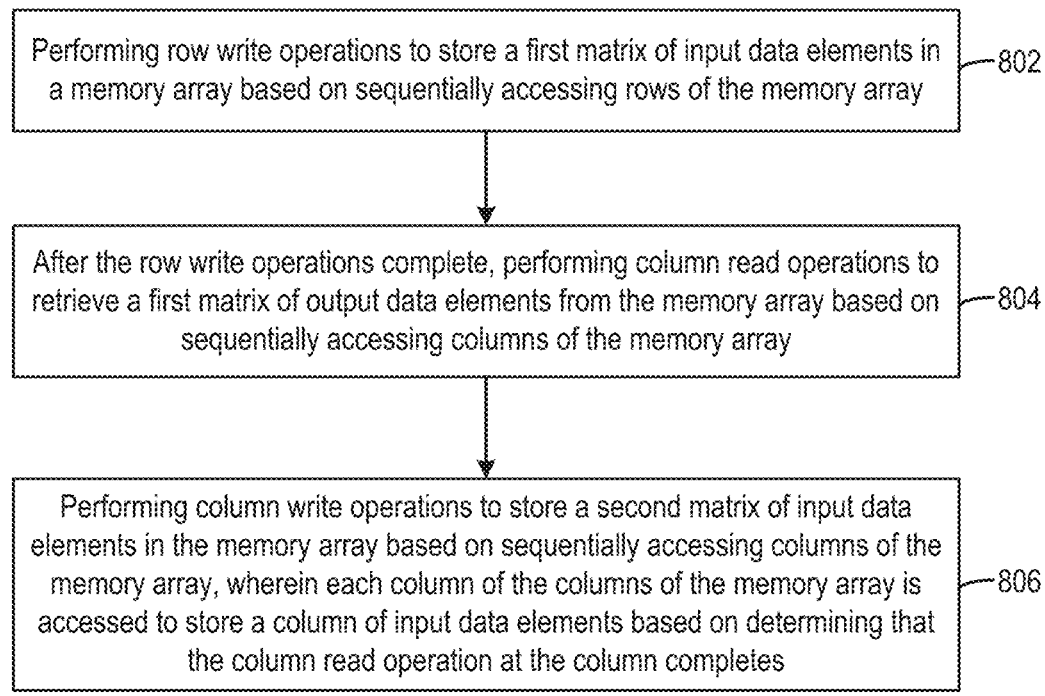
FIG. 8 illustrates an example of a flow chart of a matrix transpose operation, according to certain aspects of the present disclosure.

FIG. 8 illustrates a method 800 of performing a matrix transpose operation. Method 800 can be performed by various components of memory access circuit 504 in conjunction with memory array 502, as described in FIG. 5A-FIG. 7B.

Method 800 starts with step 802, in which memory access circuit 504 performs row write operations to store a first matrix of input data elements in a memory array based on sequentially accessing rows of the memory array. Referring to FIG. 5B, the row write operations can include a sequence of row write operations 552, with each row read operation to store a row of a first data matrix into a row of memory array 502. The rows of the first data matrix can be stored sequentially into each row of the memory array in the sequence of row write operations 552. Row 0 of memory array 502 can store row[0] (e.g., Xr[0] of FIG. 5B), wherein row[m−1] of memory array 502 can store row[m−1] of the first data matrix. During row write operations 552, memory access circuit 504 can transmit write control signal 532 having a row_write flag asserted to memory array 502 to indicate that row write operations are performed. Based on the row_write flag, the memory element of each row can store an input data element having the same row and column indices as the memory element.

In step 804, after the first write operations complete, memory access circuit 504 performs column read operations to retrieve a first matrix of output data elements from the memory array based on sequentially accessing columns of the memory array. Memory access circuit 504 can use row status table 714 to monitor the write status of rows of memory array 502 to determine that the row write operations (e.g., row write operations 552) complete. Memory access circuit 504 can then toggle the dimension state of the second read operations to perform row read operations. Referring to FIG. 5B, memory access circuit 504 can perform column read operations 554 to read columns of memory array 502 and store the columns of data in rows of a destination memory (e.g., destination memory 410) having row indices matching the column indices of the columns of memory array 502, to swap row and column indices for the transpose operation. During column read operations 554, memory access circuit 504 can transmit read control signal 542 having a row_read flag de-asserted to memory array 502, to indicate that column read operations are performed. Based on the de-asserted row_read flag, the memory element of each column can output the stored data element to an entry of the output memory (e.g., destination memory 410) having the row index and column index matching, respectively, the column index and the row index of the memory element. The first matrix of output data elements can become a transposed version of the first matrix of input data elements.

In step 806, memory access circuit 504 performs column write operations to store a second matrix of input data elements in the memory array based on sequentially accessing columns of the memory array, wherein each column of the columns is accessed to store a column of input data elements based on determining that the column read operation at the column completes. Referring to FIG. 5B and FIG. 5C, memory access circuit 504 can perform a sequence of column write operations 556 to store rows of second matrix of input data elements into columns of memory array 502. A row of the third data matrix can be stored to a column of memory array 502 having a column index matching the row index of the row. Each column write operation 556 at a column of memory array 502 can be performed based on determination that a column read operation 554 at the column completes. In some examples, a column write operation 556 and a column read operation 554 at a column of memory array 502 can be performed within the same time period (e.g., within the same clock cycle), and pairs of column write operation and column read operation can be performed in consecutive clock cycles. During column read operations 554, memory access circuit 504 can transmit write control signal 532 having a row_write flag de-asserted to memory array 502 to indicate that column write operations are performed. Based on the de-asserted row_write flag, the memory element of each row can store an input data element having the row index and column index matching, respectively, the column index and the row index of the memory element, to map a row of the second matrix of input data elements to a column of memory array 502.

Figure 9:
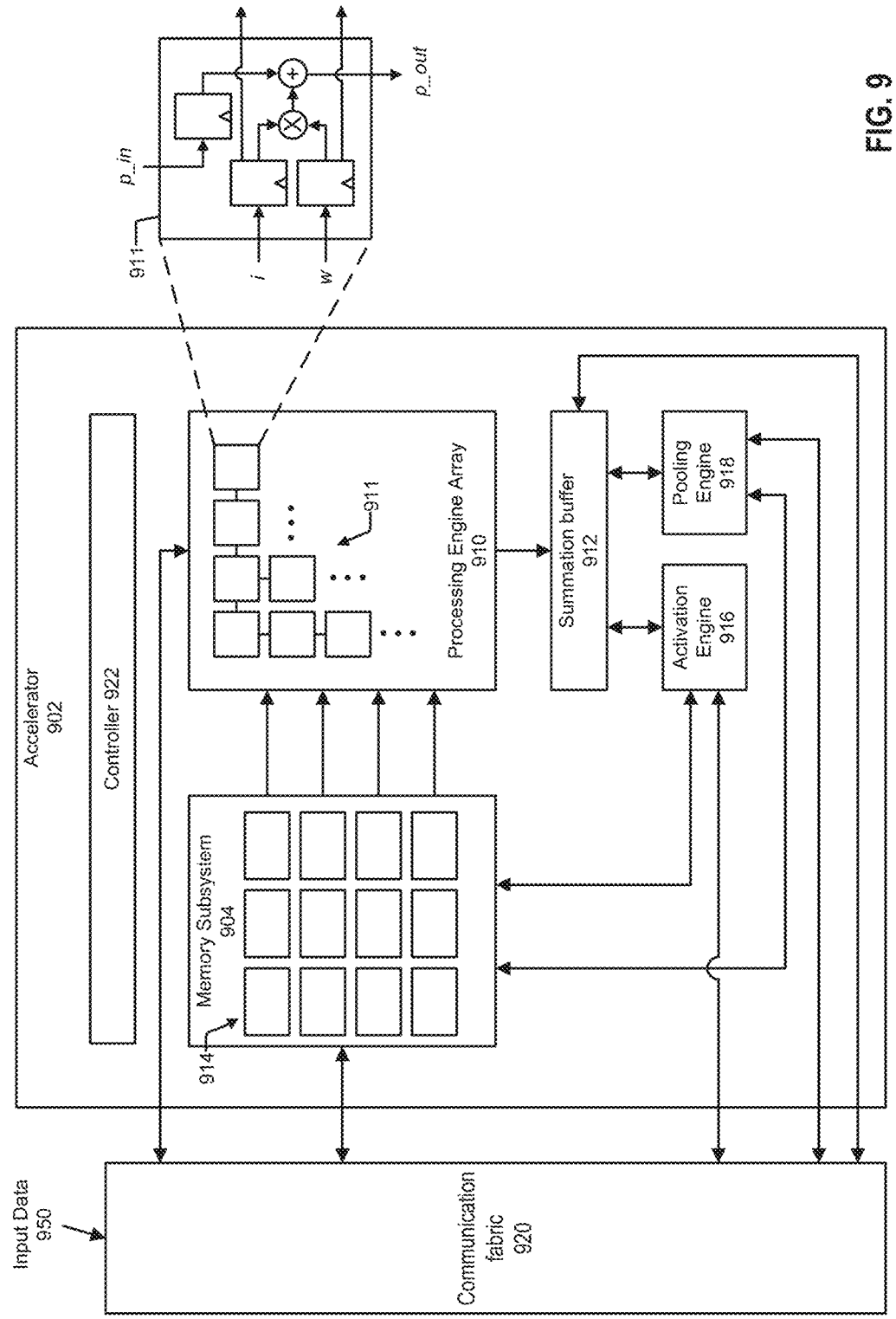
FIG. 9 illustrates an example of an integrated circuit that uses the memory system of FIGS. 5A-5C to perform matrix transpose operations.

FIG. 9 is a block diagram illustrating an example of an integrated circuit device. The example of FIG. 9 illustrates an accelerator 902. In various examples, the accelerator 902, for a set of input data (e.g., input data 950), can execute computations using a processing engine array 910, an activation engine 916, and/or a pooling engine 918. In some examples, the example accelerator 902 may be an integrated circuit component of a processor, such as a neural network processor. The processor may have other integrated circuit components, including additional accelerator engines.

In various implementations, the memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory banks' output being used. In these and other examples, though globally managed by the memory subsystem 904, each memory bank can be operated independently of any other. In some examples, memory subsystem 904 can be coupled with memory system 500 of FIG. 5A. Memory subsystem 904 can function as a destination memory to store transposed weight and intermediate outputs, or as an input memory to store data matrices to be transposed.

Having the memory banks 914 be independently accessible can increase the efficiency of the accelerator 902. For example, values can be simultaneously read and provided to each row of the processing engine array 910, so that the entire processing engine array 910 can be in use in one clock cycle. As another example, the memory banks 914 can be read at the same time that results computed by the processing engine array 910 are written to the memory subsystem 904. In contrast, a single memory may be able to service only one read or write at a time. With a single memory, multiple clock cycles can be required, for example, to read input data for each row of the processing engine array 910 before the processing engine array 910 can be started.

In various implementations, the memory subsystem 904 can be configured to simultaneously service multiple clients, including the processing engine array 910, the activation engine 916, the pooling engine 918, and any external clients that access the memory subsystem 904 over a communication fabric 920. In some implementations, being able to service multiple clients can mean that the memory subsystem 904 has at least as many memory banks as there are clients. In some cases, each row of the processing engine array 910 can count as a separate client. In some cases, each column of the processing engine array 910 can output a result, such that each column can count as a separate write client. In some cases, output from the processing engine array 910 can be written into the memory banks 914 that can then subsequently provide input data for the processing engine array 910. As another example, the activation engine 916 and the pooling engine 918 can include multiple execution channels, each of which can be separate memory clients. The memory banks 914 can be implemented, for example, using SRAM.

In various implementations, the memory subsystem 904 can include control logic. The control logic can, for example, keep track of the address spaces of each of the memory banks 914, identify memory banks 914 to read from or write to, and/or move data between the memory banks 914. In some implementations, memory banks 914 can be hardwired to particular clients. For example, a set of memory banks 914 can be hardwired to provide values to the rows of the processing engine array 910, with one memory bank servicing each row. As another example, a set of memory banks can be hard wired to receive values from columns of the processing engine array 910, with one memory bank receiving data for each column.

The processing engine array 910 is the computation matrix of the example accelerator 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples, weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 428 rows, or some other number of columns and rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural-language processing or machine translation, or the current state of a game requiring analysis to determine a next move, among other things. In some examples, the input data and the weight value are output to the right, for input to the next processing engine 911.

In the illustrated example, an input from above can include a partial sum, p_in, provided either from another processing engine 911 or from a previous round of computation by the processing engine array 910. When starting a computation for a new set of input data, the top row of the processing engine array 910 can receive a fixed value for p_in, such as zero. As illustrated by this example, i and w are multiplied together and the result is summed with p_in to produce a new partial sum, p_out, which can be input into another processing engine 911. Various other implementations of the processing engine 911 are possible.

Outputs from the last row in the processing engine array 910 can be temporarily stored in the summation buffer 912. The results can be intermediate results, which can be written to the memory banks 914 to be provided to the processing engine array 910 for additional computation. Alternatively, the results can be final results, which, once written to the memory banks 914, can be read from the memory subsystem 904 over the communication fabric 920, to be output by the system.

In some implementations, the accelerator 902 includes an activation engine 916. In these implementations, the activation engine 916 can combine the results from the processing engine array 910 into one or more output activations. For example, for a CNN, convolutions from multiple channels can be summed to produce an output activation for a single channel. In other examples, accumulating results from one or more columns in the processing engine array 910 may be needed to produce an output activation for a single node in the neural network. In some examples, activation engine 916 can be bypassed.

In various examples, the activation engine 916 can include multiple separate execution channels. In these examples, the execution channels can correspond to the columns of the processing engine array 910, and can perform an operation on the outputs of a column, the result of which can be stored in the memory subsystem 904. In these examples, the activation engine 916 may be able to perform between 1 and n parallel computations, where n is equal to the number of columns in the processing engine array 910. In some cases, one or more of the computations can be performed simultaneously. Examples of computations that each execution channel can perform include exponentials, squares, square roots, identities, binary steps, bipolar steps, sigmoidals, and ramps.

In some implementations, the accelerator 902 can include a pooling engine 918. Pooling is the combining of outputs of the columns of the processing engine array 910. Combining can include, for example, computing a maximum value, a minimum value, an average value, a median value, a summation, a multiplication, or another logical or mathematical combination. In various examples, the pooling engine 918 can include multiple execution channels that can operate on values from corresponding columns of the processing engine array 910. In these examples, the pooling engine 918 may be able to perform between 1 and n parallel computations, where n is equal to the number of columns in the processing engine array 910. In various examples, execution channels of the pooling engine 918 can operate in parallel and/or simultaneously. In some examples, the pooling engine 918 can be bypassed.

Herein, the activation engine 916 and the pooling engine 918 may be referred to collectively as execution engines. The processing engine array 910 is another example of an execution engine. Another example of an execution engine is a direct memory access (DMA) engine, which may be located outside the accelerator 902.

Input data 950 can arrive over the communication fabric 920. The communication fabric 920 can connect the accelerator 902 to other components of a processor, such as a DMA engine that can obtain input data 950 from an input/output (I/O) device, a storage drive, or a network interface. The input data 950 can be, for example, one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car or virtual-reality data. In some implementations, the memory subsystem 904 can include a separate buffer for the input data 950. In some implementations, the input data 950 can be stored in the memory banks 914 when the accelerator 902 receives the input data 950.

In some examples, the accelerator 902 can implement a neural network processing engine. In these examples, the accelerator 902, for a set of input data 950, can execute a neural network to perform a task for which the neural network was trained. Executing a neural network on a set of input data can be referred to as inference or performing inference.

The weights for the neural network can be stored in the memory subsystem 904, along with input data 950 on which the neural network will operate. The neural network can also include instructions, which can program the processing engine array 910 to perform various computations on the weights and the input data. The instructions can also be stored in the memory subsystem 904, in the memory banks 914, or in a separate instruction buffer. The processing engine array 910 can output intermediate results, which represent the outputs of individual layers of the neural network. In some cases, the activation engine 916 and/or pooling engine 918 may be enabled for computations called for by certain layers of the neural network. The accelerator 902 can store the intermediate results in the memory subsystem 904 for inputting into the processing engine array 910 to compute results for the next layer of the neural network. The processing engine array 910 can further output final results from a last layer of the neural network. The final results can be stored in the memory subsystem 904 and then be copied out to host processor memory or to another location.

Figure 10:
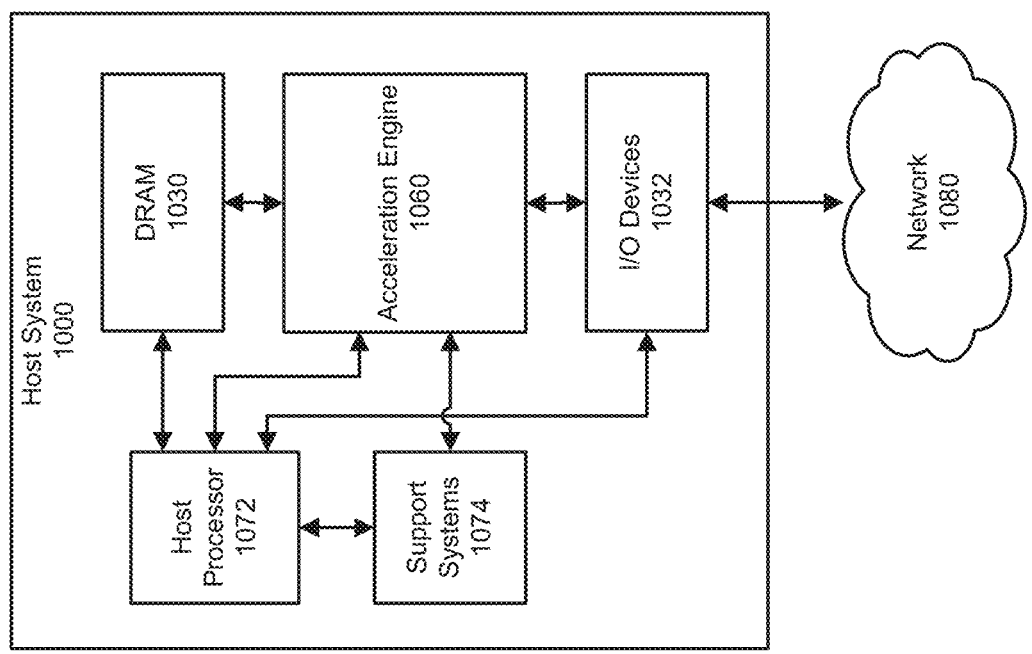
FIG. 10 illustrates an example of a host system that can use the memory system of FIGS. 5A-5C to perform matrix transpose operations.

FIG. 10 is a block diagram that illustrates an example of a host system 1000 in which an acceleration engine 1060 can be used. The acceleration engine 1060 of FIG. 10 is an example of a device that can include one or more accelerators, such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general-purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a Peripheral Component Interconnect (PCI)-based bus, over which the host processor 1072 can communicate with the acceleration engine 1060 and/or the I/O devices 1032, for example. In various examples, the host system 1000 can, alternatively or additionally, include other communication channels or buses, such as serial buses, power management buses, or storage device buses.

In some examples, software programs executing on the host processor 1072 can receive or generate input for processing by the acceleration engine 1060. In some examples, the programs can select an appropriate neural network to execute for a given input. For example, a program may be for language translation, and it can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower-level code and/or the neural network processor to a next layer to execute. In these and other examples, the execution flow of the neural network can be coordinated by software that executes in host processor 1072.

The DRAM 1030 is memory that is used by the host processor 1072 for storage of program code that the host processor 1072 is in the process of executing, as well as values that are being operated on. In some examples, the data for a neural network (e.g., weight values, instructions) can be fully or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a read-only memory (ROM) that stores boot code for booting the host system 1000 at power on, and/or basic input/output system (BIOS) code. In some examples, DRAM 1030 can be coupled with memory system 500 of FIG. 5A. DRAM 1030 can function as a destination memory to store transposed weight and intermediate outputs, or as an input memory to store data matrices to be transposed. For example, the intermediate outputs generated in forward propagation operation can be transposed and stored in DRAM 1030, as described above.

Though not illustrated here, the DRAM 1030 can store instructions for various programs, which can be loaded into and executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controlling peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include webpages, video data, audio data, images, or user data. The information in the data stores may, in some examples, be provided over the network(s) to user devices. In some cases, the data stores may, additionally or alternatively, include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, solid-state device drivers). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers. The I/O devices 1032 can also include storage drives and/or network interfaces for connecting to a network 1080. For example, the host system 1000 can use a network interface to communicate with storage devices, user terminals, other computing devices or servers, and/or other networks.

In various examples, one or more of the I/O devices 1032 can be storage devices. In these examples, the storage devices include non-volatile memory and can store program instructions and/or data. Examples of storage devices include magnetic storage, optical disks, solid-state disks, flash memory, and/or tape storage. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid-state drives. As used herein, "computer-readable storage media" does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various implementations, the support systems 1074 can include hardware for coordinating the operations of the acceleration engine 1060. For example, the support systems 1074 can include a microprocessor that coordinates the activities of the acceleration engine 1060, including moving around data on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more-limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on a chip, such as one integrated circuit on the same die and in the same package. In some examples, the support systems 1074 can include memory access circuit 504 of FIG. 5A and FIG. 7A.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task and can program the acceleration engine 1060 to execute the neural network on the set of input data. In some examples, the support systems 1074 only need to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service-provider computers, or third-party computers.

User devices can include computing devices to access an application (e.g., a web browser or mobile device application). In some examples, the application may be hosted, managed, and/or provided by a computing resources service or service provider. The application may enable a user to interact with the service-provider computer to, for example, access web content (e.g., webpages, music, video). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, or a gaming console. In some examples, the user device may be in communication with the service-provider computer over one or more networks. Additionally, the user device may be part of the distributed system managed by, controlled by, or otherwise part of the service-provider computer (e.g., a console device integrated with the service-provider computers).

The host system 1000 can also represent one or more service-provider computers. A service-provider computer may provide a native application that is configured to run on user devices, which users may interact with. The service-provider computer may, in some examples, provide computing resources such as, but not limited to, client entities, low-latency data storage, durable data storage, data access, management, virtualization, cloud-based software solutions, and electronic content performance management. The service-provider computer may also be operable to provide web hosting, databasing, computer application development and/or implementation platforms, combinations of the foregoing, or the like. In some examples, the service-provider computer may be provided as one or more virtual machines implemented in a hosted computing environment. The hosted computing environment can include one or more rapidly provisioned and released computing resources. These computing resources can include computing, networking, and/or storage devices. A hosted computing environment may also be referred to as a cloud-computing environment. The service-provider computer may include one or more servers, perhaps arranged in a cluster, as a server farm, or as individual servers not associated with one another, and may host application and/or cloud-based software services. These servers may be configured as part of an integrated, distributed computing environment. In some examples, the service-provider computer may, additionally or alternatively, include computing devices such as, for example, a mobile phone, a smart phone, a PDA, a laptop computer, a desktop computer, a netbook computer, a server computer, a thin-client device, a tablet computer, or a gaming console. In some instances, the service-provider computer may communicate with one or more third-party computers.

The modules described herein may be software modules, hardware modules, or a suitable combination thereof. If the modules are software modules, the modules can be embodied on a non-transitory computer-readable medium and processed by a processor in any of the computer systems described herein. It should be noted that the described processes and architectures can be performed either in real time or in an asynchronous mode prior to any user interaction. The modules may be configured in the manner suggested in the preceding figures, and/or functions described herein can be provided by one or more modules that exist as separate modules, and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a," "an," and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning including, but not limited to), unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order, unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure, unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (i.e., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure, unless otherwise indicated herein or otherwise clearly contradicted by context.

What is claimed is:

1. An apparatus comprising:
   a memory array having an array of memory elements arranged in rows and columns; and
   memory access circuit configured to:

perform first write operations to store rows of a first matrix of data elements at rows of the memory array;

after the first write operations complete, perform first read operations by sequentially accessing the columns of the memory array, wherein the data elements of the first matrix stored in columns of the memory array are retrieved by the first read operations and stored in rows of a destination memory array to provide a transposed version of the first matrix; and perform second write operations to store rows of a second matrix of data elements at columns of the memory array, wherein a first column of the memory array is accessed by the memory access circuit to first retrieve a first group of data elements of the first matrix and then to store a second group of data elements of the second matrix, the accessing of the first column of the memory array being performed before a third group of data elements of the first matrix are retrieved by the memory access circuit from a second column of the memory array, wherein the second matrix is different from both of the first matrix and the transposed version of the first matrix.

2. The apparatus of claim 1, wherein the memory access circuit is configured to:

after the second write operations complete, perform third read operations by sequentially accessing the rows of the memory array, wherein data elements of the second matrix stored in rows of the memory array are retrieved by the third read operations and stored in rows of the destination memory array to provide a transposed version of the second matrix; and perform third write operations to store rows of a third matrix of data elements at rows of the memory array, wherein a first row of the memory array is accessed to first retrieve a first group of data elements of the second matrix and then to store a second group of data elements of the third matrix, the accessing of the first row of the memory array being performed before a third group of data elements of the second matrix are retrieved by the memory access circuit from a second row of the memory array.

3. The apparatus of claim 1, wherein:

each memory element is associated with a row index and a column index; and each memory element comprises:
a storage device configured to store a data element;
a multiplexor configured to, in a write operation, select between a first input data element or a second input data element of an array of input data elements to be written into the storage device, the first input data element having the same matrix row index and matrix column index in the array of input data elements as, respectively, a storage row index and a storage column index of the memory element; the second input data element having the same matrix row index and matrix column index in the array of input data elements as, respectively, the storage column index and the storage row index of the memory element, the selection being based on a first control signal indicating whether to write a row or a column of the array of memory elements; and
a demultiplexor configured to, in a read operation, select between a first output data element or a second output data element of an array of output data elements as a destination of the data element stored in the storage device, the first output data element having the same matrix row index and matrix column index in the array of output data elements as, respectively, the storage row index and the storage column index of the memory element; the second output data element having the same matrix row index and matrix column index in the array of output data elements as, respectively, the storage column index and the storage row index of the memory element, the selection being based on a second control signal indicating whether to read a row or a column of the array of memory elements;

wherein in the first write operations, the multiplexor of each memory element is configured to select the first input data element to be written in the storage device;

wherein in the first read operations, the demultiplexor of each memory element is configured to output the stored data element as the second output data element; and wherein in the second write operations, the multiplexor of each memory element is configured to select the second input data element to be written in the storage device.

4. The apparatus of claim 3, wherein the storage device comprises a register that operates according to a periodic clock signal; and wherein each column is accessed to retrieve a column of first data elements and to store a column of second data elements in a same clock period of the periodic clock signal.

5. The apparatus of claim 1, further comprising a neural network processor; and wherein the neural network processor is configured to control the memory access circuit to store the transposed version of the first matrix to support at least one of a forward propagation operation or a backward propagation operation at the neural network processor.

6. An apparatus comprising:

a memory array having an array of memory elements arranged in rows and columns, each memory element of the array of memory elements being configured to store a data element; and a memory access circuit configured to:
perform a row write operation to store a first group of data elements of a first data matrix at a first row of the array of memory elements;
perform a column read operation at a first column of the array of memory elements to obtain a second group of data elements of the first data matrix, wherein the second group of data elements is used to form a second data matrix; and
perform a column write operation to store a third group of data elements of a third data matrix at the first column of the array of memory elements to replace the second group of data elements, wherein the third data matrix is different from both of the first data matrix and the second data matrix.

7. The apparatus of claim 6, wherein the column read operation is a first column read operation; and wherein the memory access circuit is configured to:
perform the first column read operation at the first column of the array of memory elements;
perform a second column read operation at a second column of the array of memory elements; and after performing the first column read operation and the second column read operation, perform the column write operation.

8. The apparatus of claim 7, wherein each memory element includes an edge-triggered storage element configured to store the data element at clock edges of a periodic clock signal; and
wherein the second column read operation and the column write operation are performed within a same clock period of a periodic clock signal.

9. The apparatus of claim 6, wherein a column write operation is performed between two column read operations.

10. The apparatus of claim 6, wherein each memory element includes an edge-triggered storage element configured to store the data element at clock edges of a periodic clock signal; and
wherein the column read operation and the column write operation are performed within a same clock period of the periodic clock signal.

11. The apparatus of claim 6, wherein the first group of data elements comprise a row of the first data matrix; and
wherein the second group of data elements are stored in a row of the second data matrix; and
wherein the second data matrix is a transposed version of the first data matrix.

12. The apparatus of claim 11,
wherein the third group of data elements comprises a row of the third data matrix;
wherein the memory access circuit is configured to, after the column write operation completes, perform a row read operation at the first row of the array of memory elements to obtain a fourth group of data elements;
wherein the fourth group of data elements is stored in a row of a fourth data matrix; and
wherein the fourth data matrix is a transposed version of the third data matrix.

13. The apparatus of claim 12,
wherein the row read operation is a first row read operation;
wherein the memory access circuit is further configured to perform a second row write operation at a second row of the array of memory elements; and
wherein the second row write operation is performed after the first row read operation and before a second row read operation at the second row of the array of memory elements.

14. The apparatus of claim 12, wherein:
in the row write operation, each memory element of a row of memory elements is configured to store a first input data element having a matrix row index and a matrix column index matching, respectively, a storage row index and a storage column index of the memory element;
in the column write operation, each memory element of a column of memory elements is configured to store a second input data element having a matrix row index and a matrix column index matching, respectively, a storage column index and a storage row index of the memory element;
in the row read operation, each memory element of the row of memory elements is configured to output the stored data element to a first output data element having a matrix row index and a matrix column index matching, respectively, a storage row index and a storage column index of the memory element; and
in the column read operation, each memory element of a column of memory elements is configured to output the stored data element to a second output data element having a matrix row index and a matrix column index matching, respectively, a storage column index and a storage row index of the memory element.

15. The apparatus of claim 14, wherein each memory element includes:
a storage device configured to store the input data element and to output the stored data element as the output data element;
a multiplexor configured to select, based on a write control signal indicating a column write operation or a row write operation, between the first input data element or the second input data element be written into the storage device; and
a demultiplexor configured to, based on a read control signal indicating a column read operation or a row read operation, output the stored data element to one of the first output data element or the second output data element.

16. The apparatus of claim 6, further comprising a neural network processor,
wherein the neural network processor is configured to control the memory access circuit to perform the row write operation and the column read operation to support at least one of a forward propagation operation or a backward propagation operation at the neural network processor.

17. A method comprising:
performing row write operations to store a first matrix of input data elements in a memory array by sequentially accessing rows of the memory array to sequentially store rows of the first matrix of input data elements;
after the row write operations complete, performing column read operations to retrieve a first matrix of output data elements from the memory array by sequentially accessing columns of the memory array to sequentially retrieve columns of the first matrix of input data elements; and
performing column write operations to store a second matrix of input data elements in the memory array by sequentially accessing columns of the memory array to sequentially store columns of the second matrix of input data elements, wherein each column of the columns of the memory array is accessed to store a column of input data elements based on determining that a corresponding one of the column read operations at the column completes, wherein the second matrix of input data elements is different from both of the first matrix of input data elements and the first matrix of output data elements.

18. The method of claim 17, further comprising:
performing the column read operations to retrieve subsets of the first matrix of input data elements stored at the columns of the memory array; and
storing the subsets of the first matrix of input data elements in rows of a second memory array to generate the first matrix of output data elements as a transposed version of the first matrix of input data elements, wherein the memory array is a first memory array.

19. The method of claim 17, further comprising:
after the column write operations complete, performing row read operations to retrieve subsets of the second matrix of input data elements stored at the rows of the memory array by sequentially accessing the rows of the memory array; and
storing the subsets of the second matrix of input data elements in rows of a second memory array to generate a second matrix of output data elements as a transposed version of the second matrix of input data elements, wherein the memory array is a first memory array.

20. The method of claim 19, wherein:

the memory array comprises an array of memory elements organized in rows and columns;

in the row write operations, each memory element stores an input data element having a matrix row index and a matrix column index matching, respectively, a storage row index and a storage column index of the memory element;

in the column read operations, each memory element outputs the stored data element to an output data element having a matrix row index and a matrix column index matching, respectively, a storage column index and a storage row index of the memory element;

in the row read operations, each memory element outputs the stored data element to an output data element having a matrix row index and a matrix column index matching, respectively, a storage row index and a storage column index of the memory element; and in the column write operations, each memory element stores an input data element having a matrix row index and a matrix column index matching, respectively, a storage column index and a storage row index of the memory element.

\* \* \* \* \*